United States Patent [19]
Woodgate et al.

[11] Patent Number: 6,008,484
[45] Date of Patent: Dec. 28, 1999

[54] OBSERVER TRACKING DIRECTIONAL DISPLAY AND OBSERVER TRACKING ILLUMINATION SYSTEM

[75] Inventors: Graham John Woodgate, Henley-on-Thames; Richard Robert Moseley, Bourton-on-the-Water; Jonathon Harrold, Sandford-on-Thames, all of United Kingdom

[73] Assignee: Sharp Kabushiki Kaisha, Osaka, Japan

[21] Appl. No.: 08/937,858

[22] Filed: Sep. 25, 1997

[30] Foreign Application Priority Data

Sep. 27, 1996 [GB] United Kingdom ............. 9620261

[51] Int. Cl.⁶ ............................ G02B 27/00; H04N 13/00
[52] U.S. Cl. ............................. 250/201.1; 250/203.1; 250/204; 250/206.1; 359/458; 359/466; 348/51; 348/54; 348/59
[58] Field of Search .................. 250/208.1, 208.2, 250/206.1, 206.2, 201.1, 203.1, 203.2, 204; 345/38, 48, 50, 55, 87; 359/462, 463, 464, 466, 467, 468, 454, 455, 456, 458; 348/51, 52, 53, 54, 56, 59

[56] References Cited

U.S. PATENT DOCUMENTS 5,083,199  1/1992  Borner ............................. 358/88

FOREIGN PATENT DOCUMENTS

| 0404289 | 12/1990 | European Pat. Off. . |
|---|---|---|
| 0625861 | 11/1994 | European Pat. Off. . |
| 0656555 | 6/1995 | European Pat. Off. . |
| 0721131 | 7/1996 | European Pat. Off. . |
| 0726482 | 8/1996 | European Pat. Off. . |
| 2145897 | 4/1985 | United Kingdom . |
| 9318428 | 9/1993 | WIPO . |
| 9420875 | 9/1994 | WIPO . |

OTHER PUBLICATIONS

Search Report for Application No. GB 9620261.9; Dated Dec. 12, 1996.

European Search Report for Application No. 97307570.8; Dated Feb. 17, 1998.

H. Imai et al., SPIE, vol. 2653, pp. 49–55, 1996, "Eye–Position Tracking Stereoscopic Display Using Image Shifting Optics" (no month provided).

T. Hattori et al., SPIE, vol. 2177, pp. 143–149, 1994, "Stereoscopic Liquid Crystal Display I (General Description)" (no month provided).

*Primary Examiner*—John R. Lee

[57] ABSTRACT

Observer tracking is provided in an autostereoscopic 3D display, for instance of the type including an LCD panel 2 behind a parallax barrier. An infrared sensor such as a position sensitive detector is provided on the LCD panel. The parallax barrier extends over the detector so as to form an image of the observer or of a reflective target worn by the observer on the detector. The parallax barrier is moved so as to keep the image at a constant position on the detector. The viewing zone thus track the observer.

41 Claims, 27 Drawing Sheets

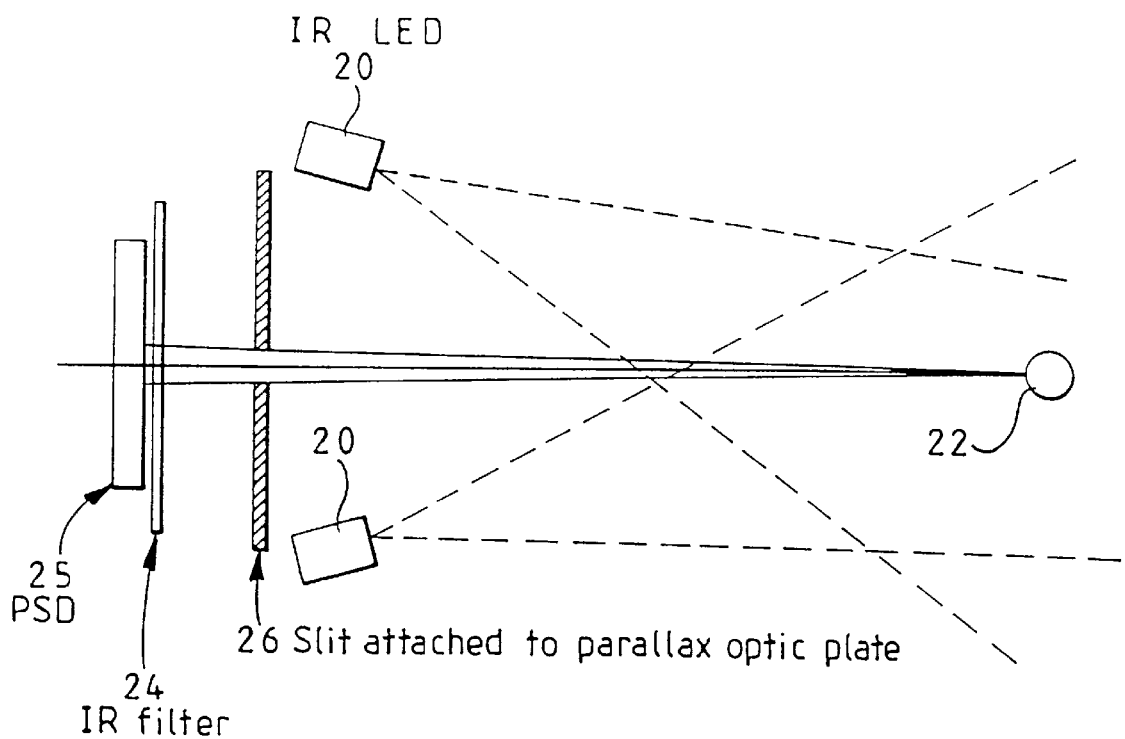
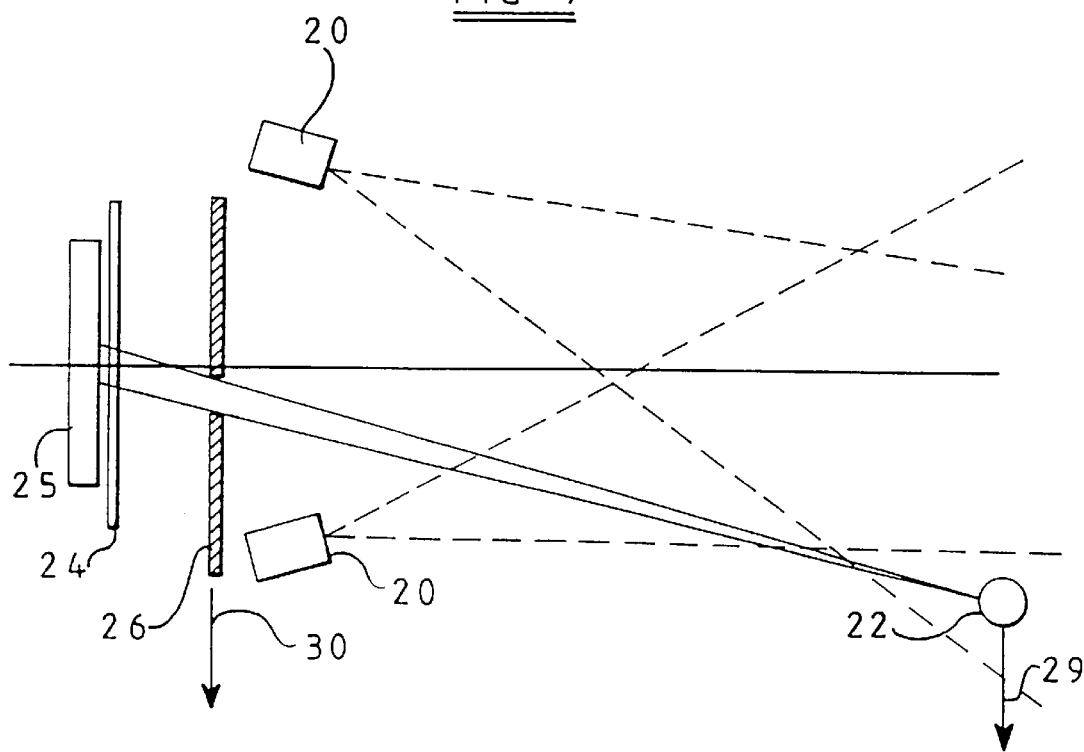
FIG 7

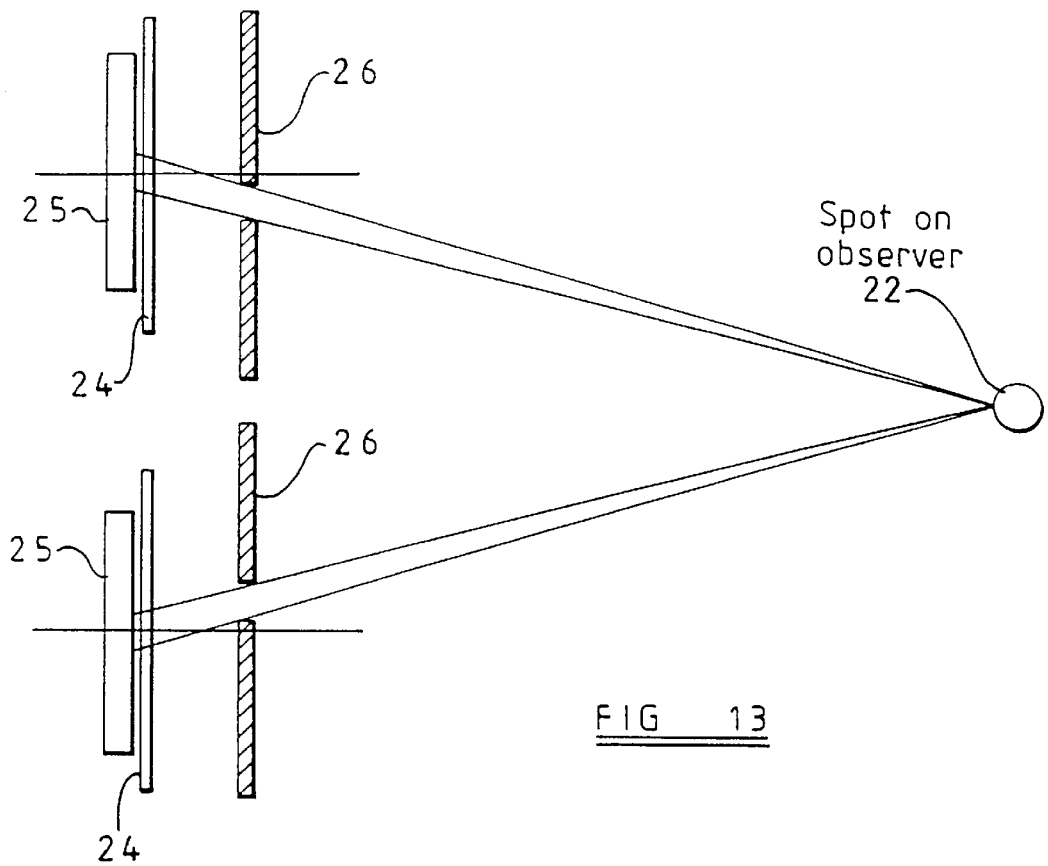
FIG 13
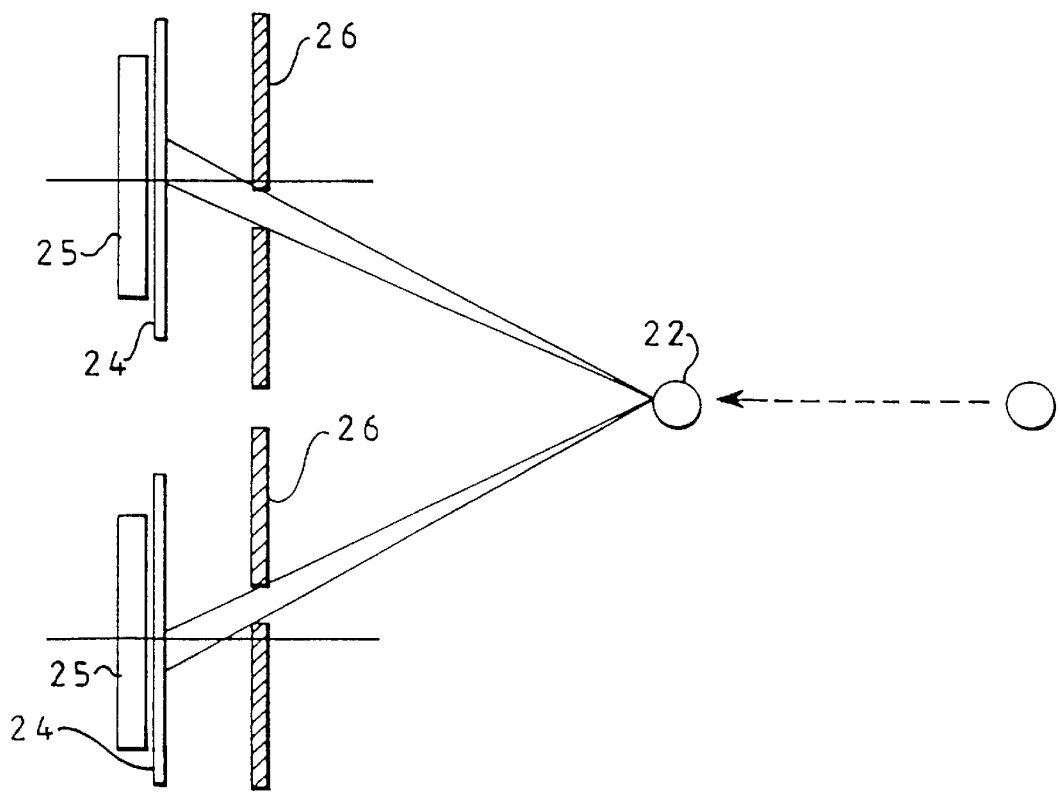

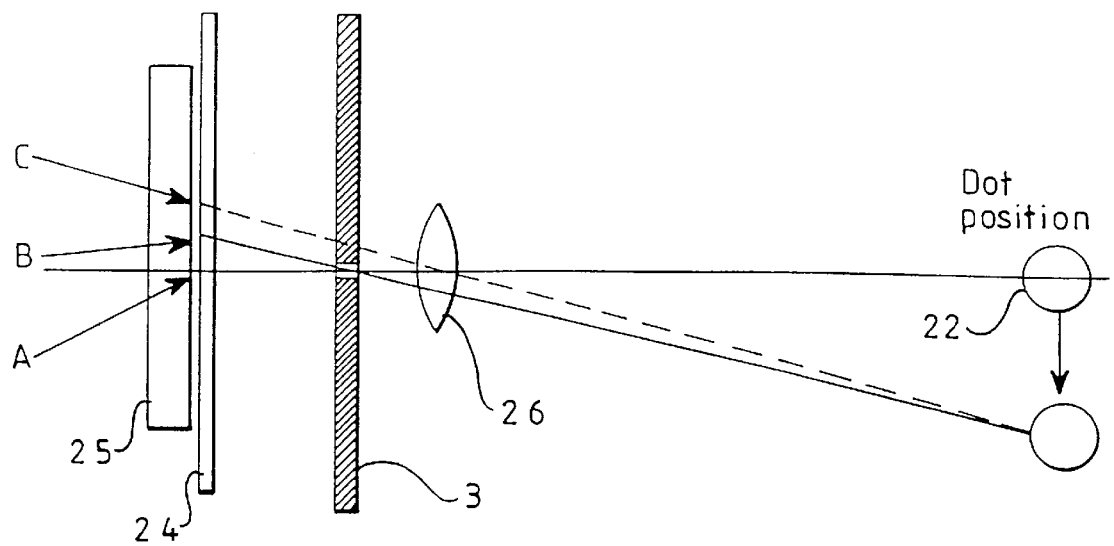
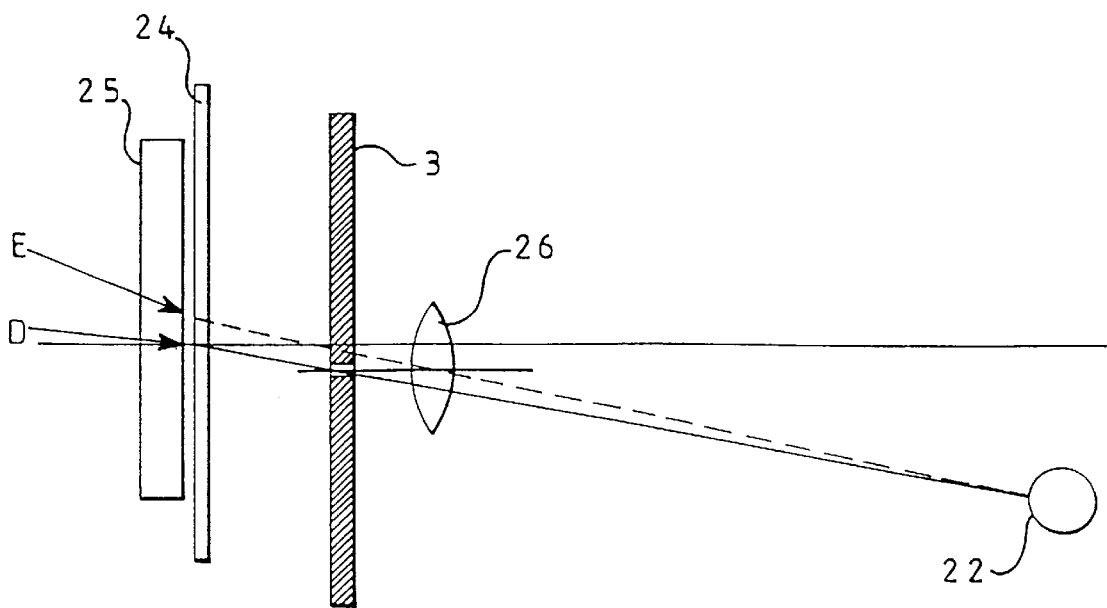
FIG 16

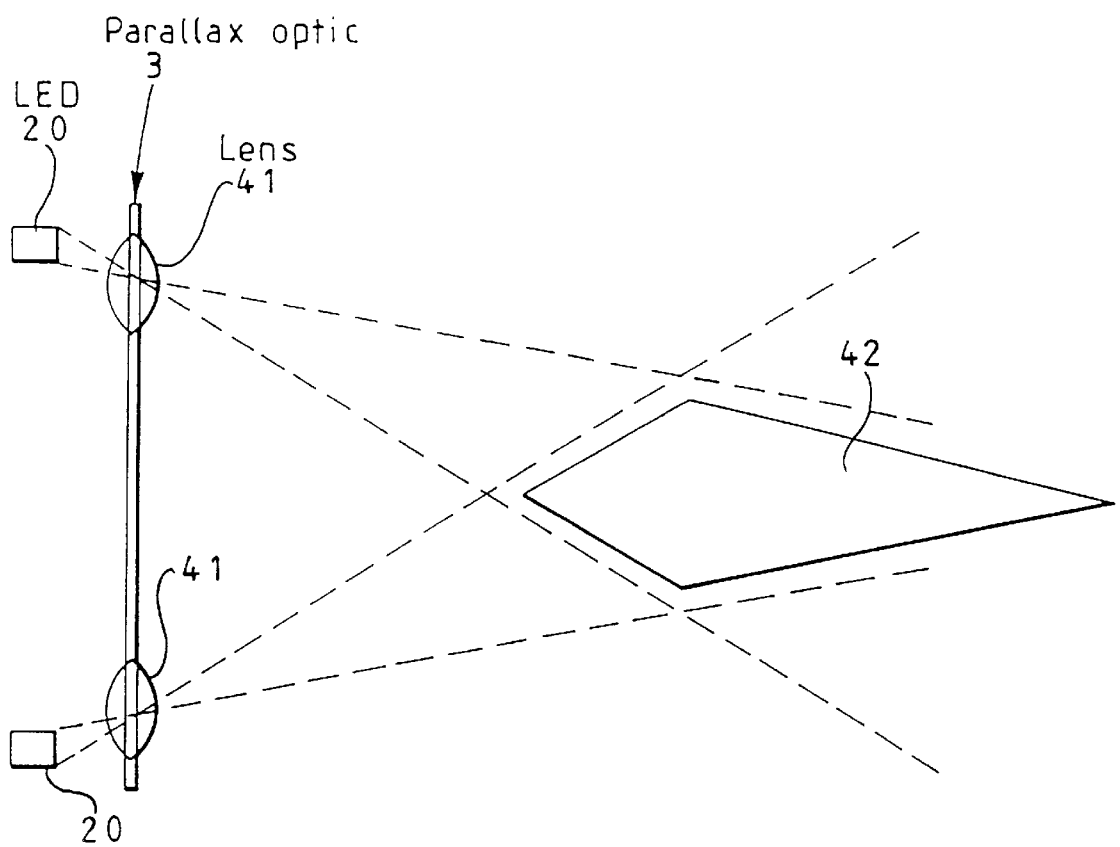
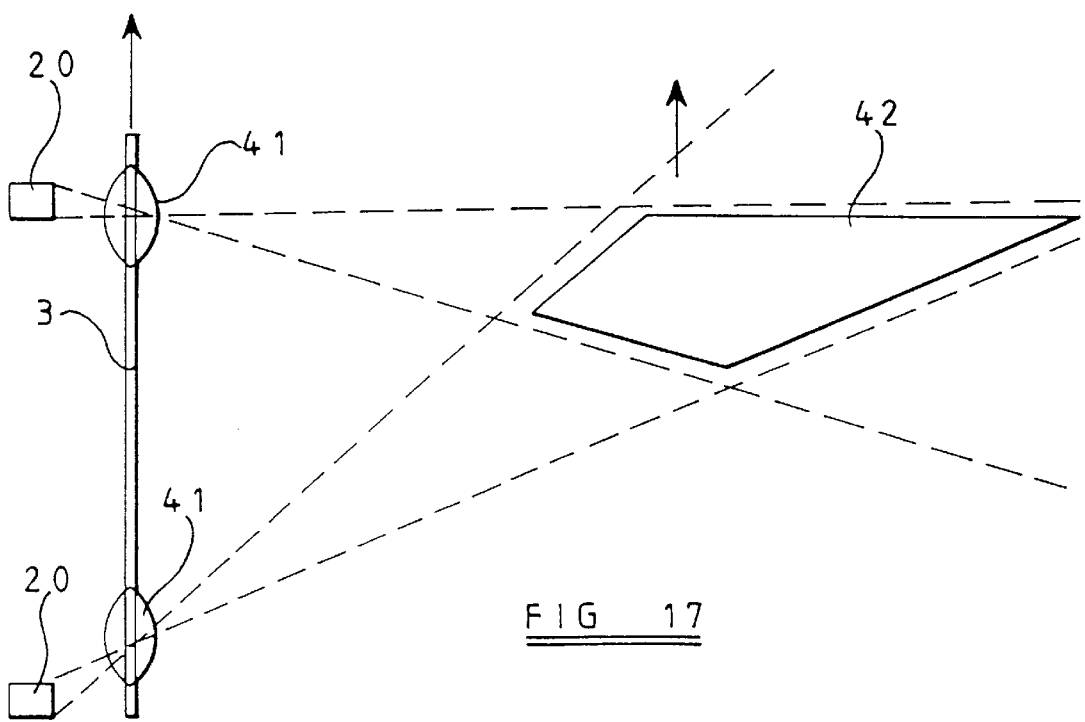
FIG 17

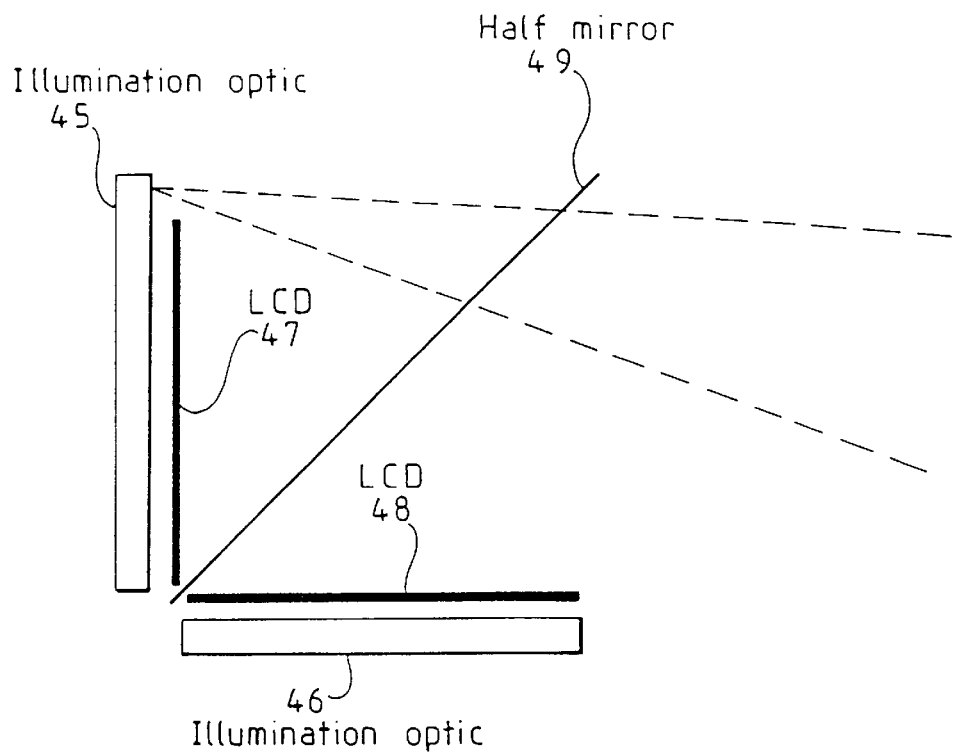
FIG 21
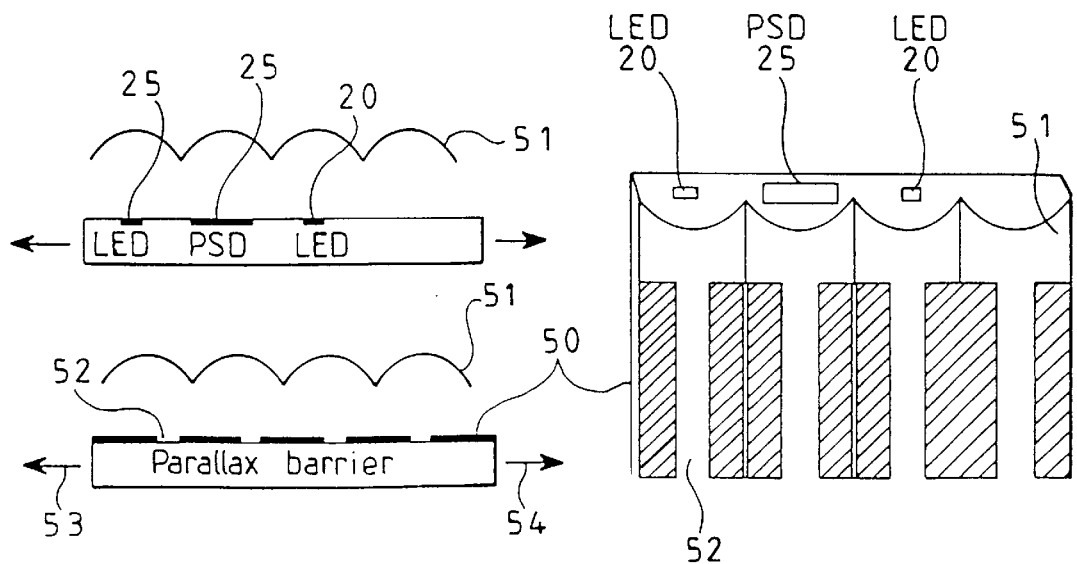

OBSERVER TRACKING DIRECTIONAL DISPLAY AND OBSERVER TRACKING ILLUMINATION SYSTEM

TECHNICAL FIELD OF THE INVENTION

The present invention relates to an observer tracking directional display, for instance for use as an autostereoscopic three dimensional (3D) display. The invention also relates to an observer tracking illumination system which is suitable for use in directional displays.

BACKGROUND OF THE INVENTION

Observer tracking autostereoscopic 3D displays are disclosed, for instance, in EP 0 656 555, EP 0 726 482, EP 0 404 289 and in "Eye-Position Tracking Stereoscopic Display Using Image Shifting Optics", H. Imai et al, SPIE Vol. 2653, pp 49–55, February 1996. In such displays of the autostereoscopic 3D type, viewing zones are formed such that, when an observer is disposed so that left and right eyes are in adjacent viewing zones, a 3D image is perceptible. In order to allow the observer more freedom of movement while maintaining the 3D effect, the position of the observer may be measured, for instance by the technique disclosed in British Patent Application No. 9616190.6, and this information may be used to control the display so that the viewing zones move with or track the observer. In the case of EP 0 726 482, observer tracking is performed by changing the two dimensional (2D) images provided in the viewing zones as the observer moves laterally with respect to the display.

"Stereoscopic liquid crystal display I (General description)", T. Hattori et al, Pmroc. SPIE vol. 2177, pp 143–149, February 1994 discloses an autostereoscopic 3D display in which 2D images displayed by spatial light modulators are illuminated by a 2D display which acts as a backlight and co-operates with a converging optical system to direct the different 2D views into the different viewing zones. An observer is illuminated by an infrared source and monitored by an infrared video camera. The image from the video camera is effectively displayed by the 2D monochrome display so as to provide observer tracking by forming on the 2D display a bright patch which follows movement of the observer.

FIG. 1 of the accompanying drawings illustrates a mechanically tracked autostereoscopic 3D display comprising a backlight 1 which illuminates a spatial light modulator (SLM) in the form of a liquid crystal device (LCD) 2. A movable lenticular screen 3 is disposed between the observer and the LCD 2 and comprises a plurality of cylindrically converging lenticules such as 4. Each lenticule 4 is optically aligned with two columns of picture elements (pixels) such as 5 and 6. Alternate columns of pixels display vertical strips of a respective 2D image and the lenticules 4 direct light from the backlight passing through the columns 5 and 6 into two viewing zones 7 and 8 for the left and right eyes of an observer.

An observer tracking sensor (not shown) detects the position of the observer and the lenticular screen 3 is moved laterally with respect to the LCD 2 in response to the observer measured position so that the left and right eyes of the observer are maintained in the viewing zones 7 and 8, respectively.

The display shown in FIG. 2 of the accompanying drawings differs from that shown in FIG. 1 in that the lenticular screen is replaced by a parallax barrier 3. The parallax barrier 3 comprises a plurality of parallel evenly spaced vertical slits such as 4 which form the viewing zones 7 and 8 in essentially the same way as the lenticules of the display shown in FIG. 1. The parallax barrier 3 is movable laterally with respect to the LCD 2 as indicated by arrows 9 and 10 so as to track lateral movement of the observer as indicated by an arrow 11.

As shown in FIG. 3 of the accompanying drawings, the moving optic 3, which may be the lenticular screen or the parallax barrier shown in FIGS. 1 and 2, is mechanically connected to an electromechanical actuator 12, such as a voice coil stage. The stage 12 is controlled by a stage controller 13 in the form of a servo having positional feedback indicated at 14.

A tracking sensor 15 measures the position of the observer 16 and supplies the measurement signals to an arrangement 17 for converting the signals from the sensor 15 into a measurement of the position of the observer 16 relative to the display. The measured position is then compared with a display calibration 18 so as to determine the appropriate position of the moving optic 3 relative to the LCD 2. The calibration comprises information stored in a look-up table determined as a result of calibrating the display. The required movement of the moving optic 3 is determined at 19 and supplied to the stage controller 13. The moving optic 3 is thus moved so that the observer eyes remain in the viewing zones.

The tracking sensor 15 may comprise a video camera connected to an image processor for detecting the position of the head of the observer. However, such systems are expensive because of the cost of the camera and, in particular, the cost of the image processor.

Another known type of tracking sensor uses a magnetic position detector. However, such systems are prone to magnetic interference and require the user to wear a detector attached to the display by a cable.

Another type of tracking sensor relies on detecting the position of the head of the observer by means of reflection of infrared by the observer or by a retro-reflective spot, for instance stuck on the forehead of the observer. The reflected infrared radiation is imaged by a lens on to a position sensitive detector (PSD) as shown in FIG. 4 of the accompanying drawings. An infrared light emitting diode (LED) 20 emits infrared light which is supplied via an illumination lens 21 to illuminate a region in front of the display where an observer may be tracked. The infrared light reflected from the retro-reflecting dot or target 22 is collected by a collection lens 23 and is imaged through an infrared-passing filter 24 on the PSD 25. The PSD 25 may be of known type and supplies data indicating the position on the light-sensitive surface thereof of the "centre of gravity" of illumination "or centre of illumination".

These known arrangements suffer from various disadvantages. Firstly, for mechanically tracked systems, the alignment of the observer tracking sensor and the mechanics controlling the position of the parallax optic has to be highly accurate and robust since, otherwise, the display would lose calibration and the observer would start to lose the 3D image. This places severe requirements on the complexity and tolerance, and hence cost, of the display. Further, calibration data have to be generated during assembly of the display so as to account for differences in the alignment of the tracking sensor with respect to the remainder of the display. This substantially increases assembly cost. Further, the actual position of the actuator 12 may differ from the position indicated by the positional feedback 14, for instance because of backlash, inaccuracies in positioning and system lags.

SUMMARY OF THE INVENTION

According to a first aspect of the invention, there is provided an observer tracking directional display comprising an image display and a parallax optic, characterised by a first optical radiation sensor fixed with respect to one of the image display and the parallax optic, a first optical element fixed with respect to the other of the image display and the parallax optic and arranged to image optical radiation from an observer on the first sensor, and means responsive to the first sensor for controlling the supply of left eye and right eye images to the observer.

The first sensor may be sensitive to infra-red radiation.

The first sensor may be fixed to the image display and the first optical element may be fixed to the parallax optic. The first sensor may be disposed in an image plane of the image display. The first optical element may comprise part of the parallax optic. The parallax optic may comprise a plurality of parallax elements and the first sensor may comprise a plurality of sensor elements, each of which is associated with a respective one of the parallax elements.

The controlling means may be arranged to adjust the relative lateral positions of the image display and parallax elements or the parallax of the parallax optic so as to the maintain an image of the optical radiation from the observer at a substantially constant position on the first sensor. The controlling means may be arranged to move the parallax optic with respect to the image display.

The parallax optic may comprise a spatial light modulator arranged to simulate a parallax barrier having a plurality of apertures and the controlling means may be arranged to control the positions of the apertures. The apertures may be slits.

The first sensor may comprise a position sensitive detector. The position sensitive detector may be a one or two dimensional position sensitive detector. The position sensitive detector may comprise an optically uncovered integrated circuit dynamic random access memory.

The controlling means may be arranged to switch off the image display or a light source for illuminating the image display when the width of an image of the optical radiation from the observer on the first sensor exceeds a predetermined width.

The controlling means may be arranged to fade display of an image progressively as the width of an image of the optical radiation from the observer on the first sensor approaches a predetermined width.

The display may comprise: a second optical radiation sensor fixed with respect to one of the image display and parallax optic; and a second optical element fixed with respect to the other of the image display and the parallax optic and arranged to image optical radiation from the observer on the second sensor. The second sensor and the second optical element may be substantially identical to the first sensor and the first optical element, respectively. The second sensor and the second optical element may be laterally spaced from the first sensor and the first optical element, respectively.

The controlling means may be arranged to adjust the relative lateral positions of the image display and parallax element of the parallax optic so that the position of an image of the optical radiation from the observer on the first sensor is displaced form a first pre-determined position by an amount equal and in an opposite direction to a displacement from a second pre-determined position of an image of the optical radiation from the observer on the second sensor.

The controlling means may be arranged to adjust the relative lateral and longitudinal positions of the image display and parallax elements of the parallax optic so as to maintain images of the optical radiation from the observer at substantially constant positions on the first and second sensors, The display may comprise at least one optical radiation source fixed with respect to one of the image display and the parallax optic and a respective beam forming optic fixed with respect to the other of the image display and the parallax optic and arranged to form radiation from the or each source into a beam. The source or one of the sources may be disposed adjacent to the first sensor and the respective beam forming optic may comprise the first optical element. The first optical element may comprise a holographic optical element.

The image display and the parallax optic may be arranged to form at least three viewing zones in each of at least two lobes and the controlling means may be arranged to change images in the viewing zones. The image display may comprise laterally substantially contiguous columns of picture elements and the first sensor may comprise a plurality of sensor elements, each of which is vertically aligned with the edge of a respective adjacent pair of columns.

The image display may comprise a spatial light modulator. The spatial light modulator may comprise a liquid crystal device. The liquid crystal device may be an active matrix device. The first sensor may comprise at least one optically exposed thin film transistor in an active matrix layer of the device.

The display may comprise an image controller responsive to the first sensor for controlling image data supplied to the image display so as to provide look-around viewing.

According to a second aspect of the invention, there is provided an observer tracking illumination system for a directional display, comprising a light source and an optical system for directing light from the light source into a plurality of viewing zones, characterised by a first optical radiation sensor fixed with respect to the light source, a first optical element fixed with respect to the optical system and arranged to image optical radiation from an observer on the first sensor, and means responsive to the first sensor for controlling at least one of the light source and the optical system for tracking the observer with the viewing zones.

The light source may be movable with respect to the optical system.

The light source may comprise a plurality of light source elements and the optical system may comprise a plurality of viewing zone forming elements. The light source may comprise an illuminator and a spatial light modulator arranged to simulate a parallax barrier having a plurality of apertures forming the light source elements and the controlling means may be arranged to control the positions of the apertures. The apertures may b slits. The spatial light modulator may be a liquid crystal device.

The optical system may be a parallax optic, such as a lens array.

The first optical element may comprise the optical system.

It is thus possible to provide an arrangement in which an observer automatically sees the correct image for a wide range of viewing positions. The requirements for calibration of an observer tracking system are very substantially reduced so that the cost of manufacture is likewise reduced. The amount of processing required for observer tracking is substantially reduced so that it is possible to provide displays which are cheaper and use less power. By incorporating the tracking system within the display, robustness and reliability are substantially increased. In embodiments where the observer illumination system for tracking works in co-operation with the measurement system, the signal-to-noise ratio of tracking is substantially improved. Further, interference caused by radiation received from background objects can be substantially reduced or removed.

The invention will be further described, by way of example, with reference to the accompanying drawings, in which:

BRIEF DESCRIPTION OF THE DRAWING

FIG. 7 illustrates part of the display of FIG. 5 during operation;

FIG. 13 illustrates in more detail a two sensor system and the effect of longitudinal observer movement;

FIG. 16 illustrates a modification providing amplified positional data;

FIG. 17 illustrates a modification in which an integrated illumination system is provided;

FIG. 21 shows a compact illuminator beam combiner display constituting another embodiment of the invention;

DETAILED DESCRIPTION OF THE INVENTION

Figure 1:
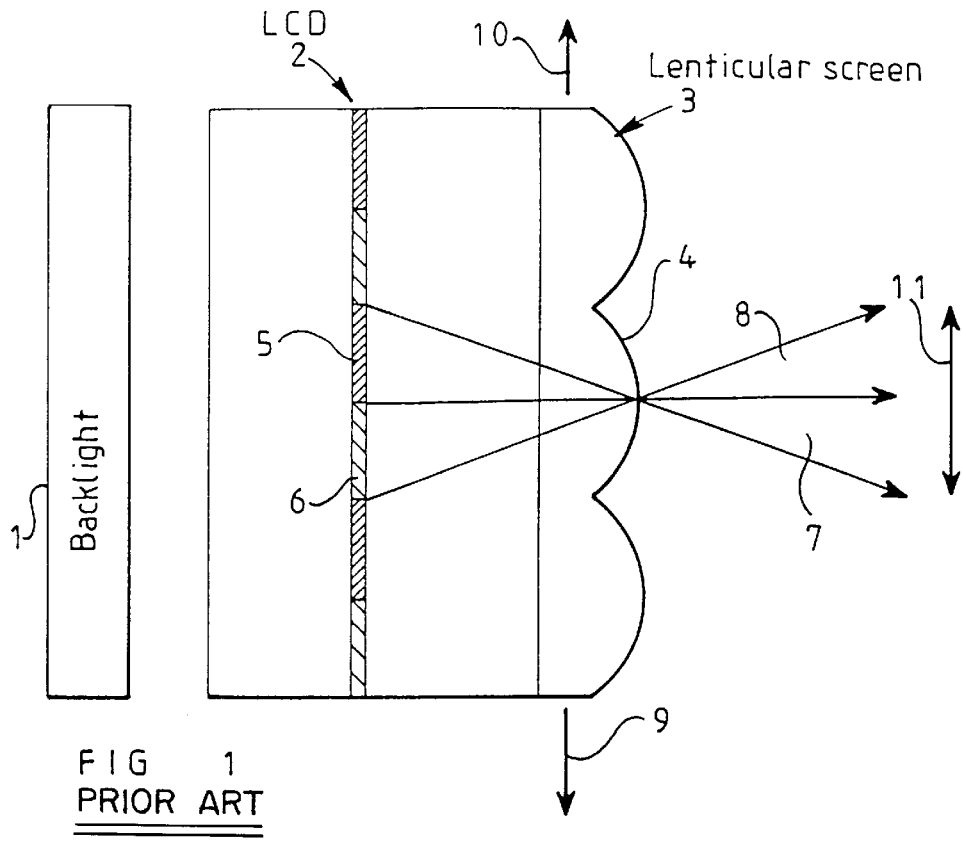
FIGS. 1 and 2 are diagrammatic plan views of known mechanically tracked autostereoscopic 3D displays.

Like reference numerals refer to like parts throughout the drawings.

Figure 2:
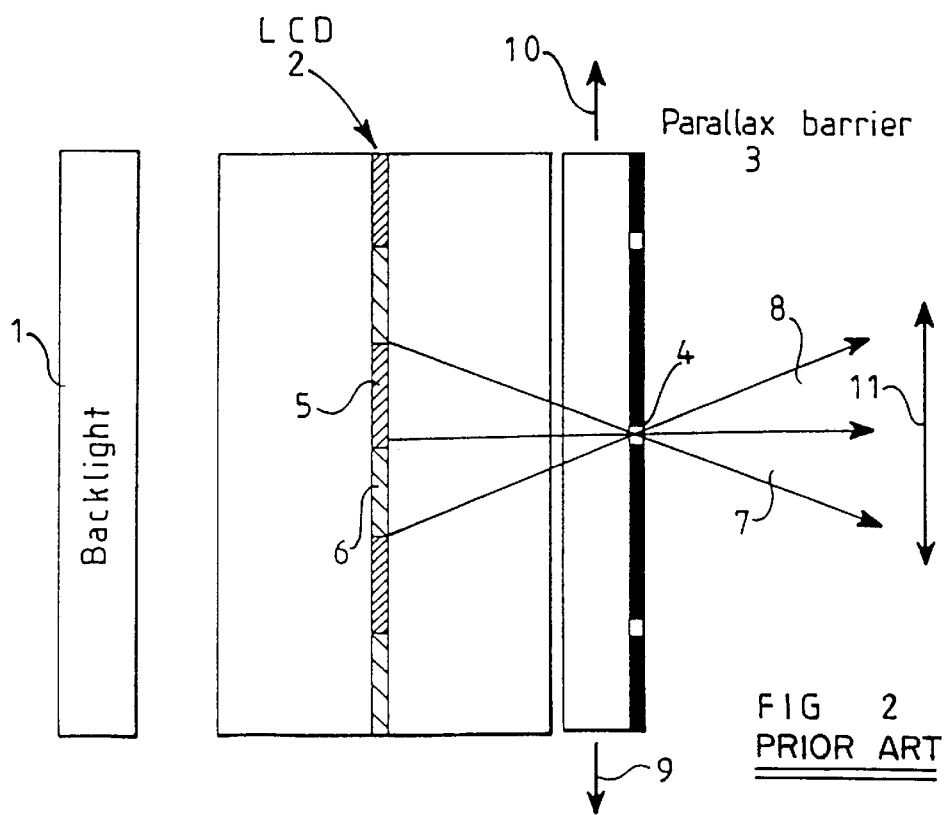
Figure 5:
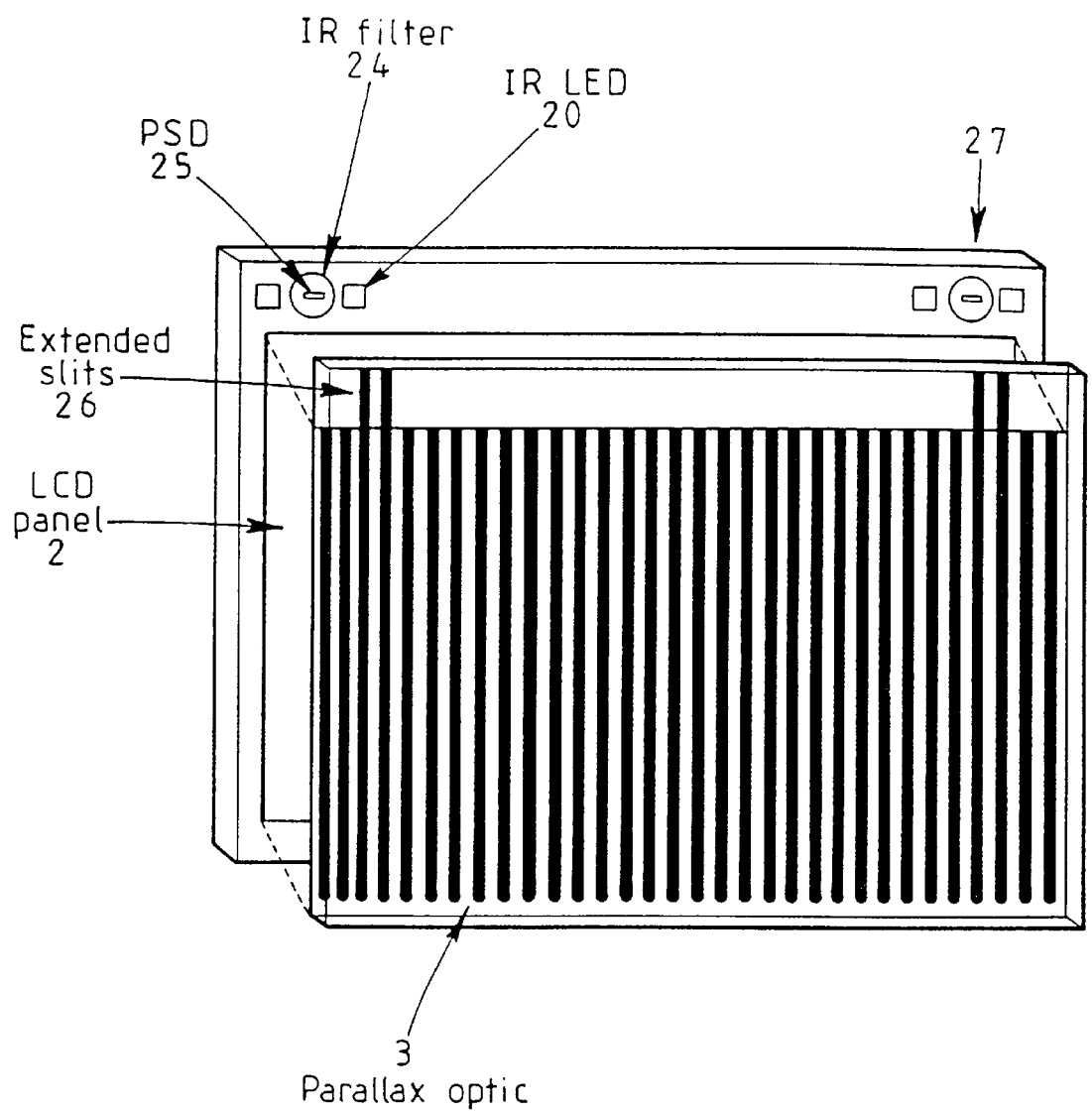
FIG. 5 is a general view of a display constituting an embodiment of the invention.

The observer tracking autostereoscopic 3D display shown in FIG. 5 is of a type similar to that shown in FIG. 2 and comprises an LCD panel 2 associated with a parallax optic 3 shown in the form of a parallax barrier. For the sake of clarity of illustration, the parallax barrier 3 has been shown displaced forwardly from the LCD panel 2 in FIG. 5. The parallax barrier 3 is movable laterally and optionally longitudinally with respect to the panel 2.

Figure 4:
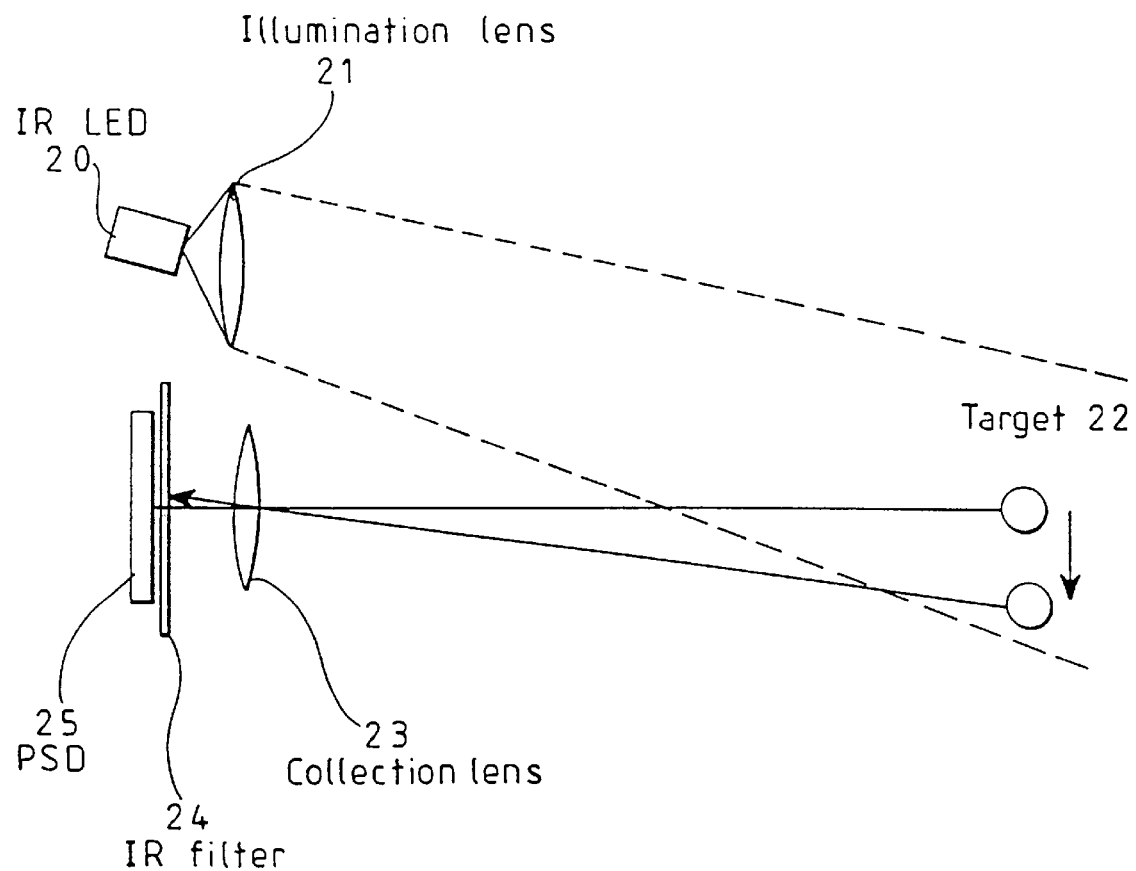
FIG. 4 illustrates diagrammatically a known system for detecting the position of a target.

A PSD system of the type shown in FIG. 4 is provided in the display. In particular, infrared light emitting diodes (LED) 20 provide a source of infrared illumination and a PSD 25 is disposed behind a filter 24 for passing infrared radiation and for attenuating or blocking other radiation. The PSD 25 is fixed to or integrally formed within the LCD panel 2.

The collection lens 23 of FIG. 4 is replaced by an extended slit 26 so as to provide an optical element which images infrared radiation reflected from an observer or from a reflective dot worn by the observer through the filter 24 onto the PSD 25. The optical element thus moves with the parallax optic 3 during observer tracking.

The display may be operated with one or two PSD systems as described hereinafter. In the case of two such systems, a second substantially identical system 27 is laterally spaced symmetrically from the first system.

Figure 3:
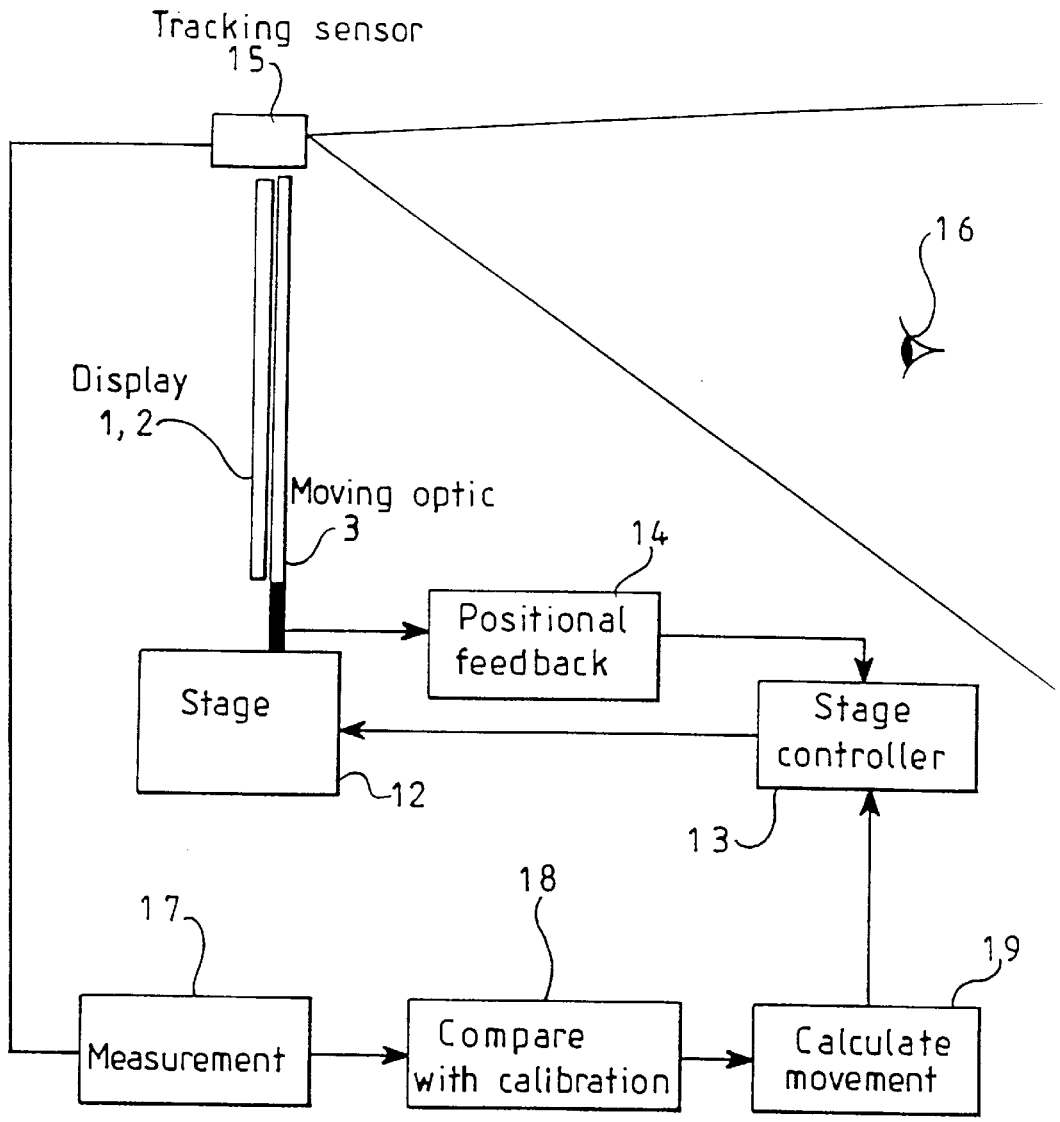
FIG. 3 is a block schematic diagram of a display of the type shown in FIGS. 1 and 2.
Figure 6:
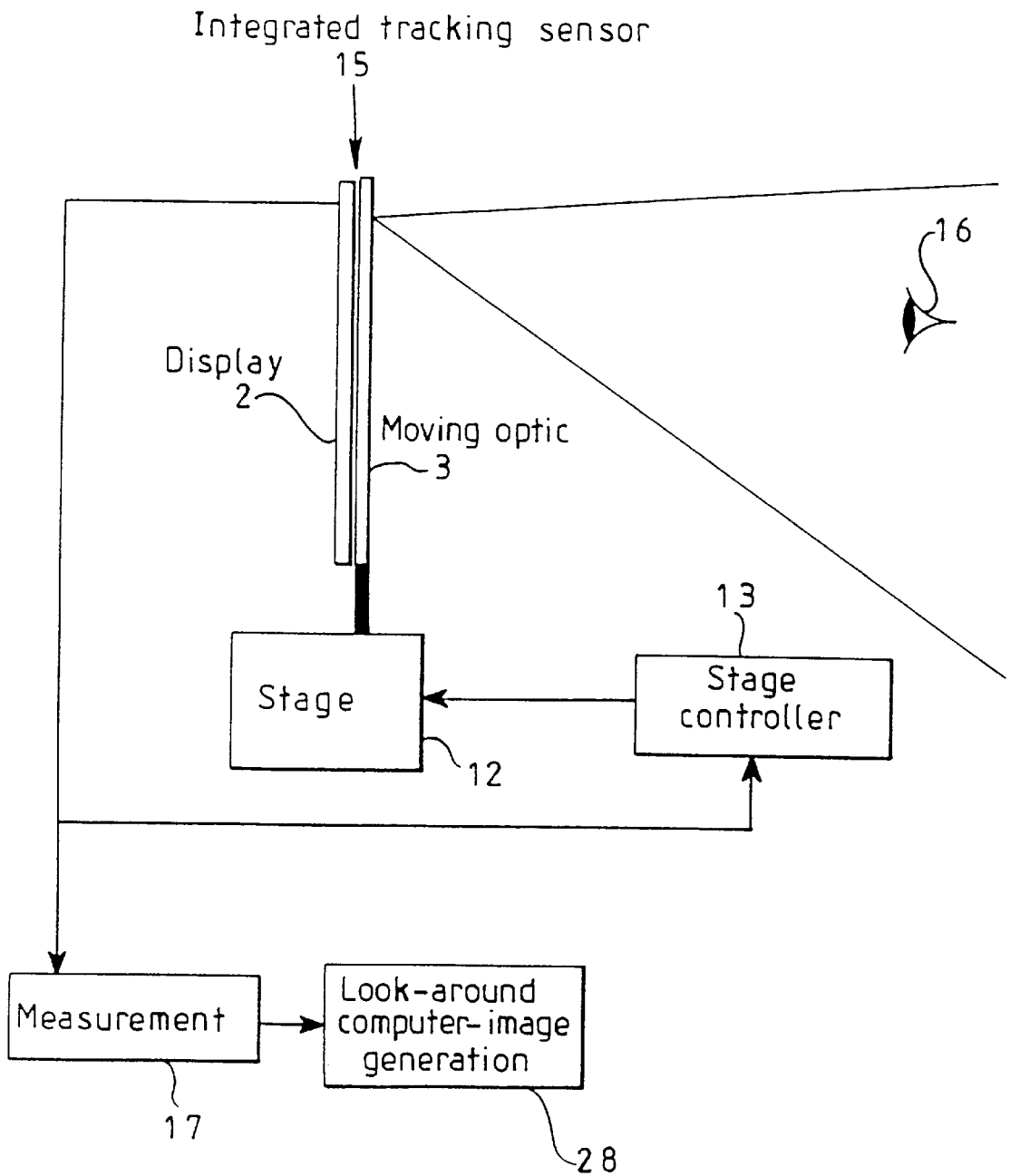
FIG. 6 is a block schematic diagram of the display of FIG. 5.

As shown in FIG. 6, the display is considerably simplified with respect to the known type of observer tracking display shown in FIG. 3. Within the actuator, no positional feedback 14 is required. Further, if no look-around facility is required, the measurement, comparison, and calculation functions 17, 18 and 19 are not required. If a look-around facility is required, the measurement stage 17 may be provided so as to control, for instance, a look-around computer image generation arrangement 28. In this case, observer movement is used to control the images supplied to the display 2 so as to permit 3D viewing from a different viewpoint.

Operation of the observer tracking system is illustrated in FIG. 7. The upper part of FIG. 7 illustrates the relative positions of the slit 26 which is attached to or integral with the parallax optic 3 and the PSD 25 which is fixed to the LCD panel 2. Operation is illustrated for a single PSD system disposed laterally centrally of the display.

The observer wears a reflective dot or target 22 which improves signal-to-noise ratio. In the upper part of FIG. 7, the target 22 and hence the observer are assumed to be located directly in front of the middle of the display.

The region throughout which an observer may be tracked is irradiated by infrared radiation from the LEDs 20 and the target 22 reflects the infrared radiation back towards the display. The slit 26 acts as an optical element which causes the centre of the PSD 25 to be illuminated. The stage controller 13 positions the parallax optic 3 so that the slit 26 images the radiation at the centre of the PSD 25, which is embodied as a lateral one dimensional array but may be embodied in other ways.

If the observer and hence the target 22 move in the direction of the arrow 29 as shown in the lower part of FIG.

7, the slit 26 images the radiation on a part of the PSD 25 which is displaced from the centre thereof. The PSD 25 supplies a signal to the controller 13 indicating the amount and direction of the displacement. The controller 13 controls the stage 12 so as to move the parallax optic 3 and hence the slit 26 in the direction of arrow 30 until the infrared radiation reflected from the target 22 is again imaged by the slit 26 on to the centre of the PSD 25.

Alternatively the signal from the PSD 25 is used directly as a feedback signal for the stage 12 so that the signal from the PSD 25 is minimised through stage movement without any direct measurement being taken.

The LCD 2 comprises an SLM of the type disclosed in EP 0 625 861 and having two laterally contiguous columns of pixels aligned with each slit of the parallax barrier 3. The centre of the PSD 25 is disposed on the vertical line between adjacent contiguous pixel columns so that, when the parallax optic 26 is positioned such that the reflected infrared radiation from the target 22 is imaged at the centre of the PSD 25, viewing zones from the adjacent contiguous columns of pixels are formed such that the left and right eyes of the observer are disposed in the left and right viewing zones, respectively. To achieve this, the target 22 is worn, for instance, on the middle of the forehead or on the bridge of the nose of the observer. The boundary between the two viewing zones substantially tracks the target 22 so that, within the limits of the viewing region and of the speed of observer movement, the eyes remain within the correct viewing zones at all times.

The pixels need not be contiguous but may, for example, be of the super high aperture type as found, for example, in Sharp LQ11530.

The only "calibration" of the display relates to the positioning of the PSD 25 and relative alignment (if necessary) of the parallax optic 3 and the optic for the PSD 25. For the contiguous two viewing zone display as described, provided the PSD 25 is positioned such that its centre is on the vertical line which is colinear with the adjacent edges of pixels in the group of two adjacent laterally contiguous columns, no further calibration is necessary. However, if the PSD 25 is displaced from this ideal position, for instance as a result of manufacturing tolerances, a single adjustment may be provided within the controller 13 such that the parallax optic 3 is at a position relative to the LCD panel 2 where the boundary between the left and right viewing windows passes through the target 22. The controller 13 may thus be calibrated in a single step to stop movement of the parallax optic 3 at a position where the radiation reflected by the target 22 is imaged at a point displaced from the centre of the PSD 25.

No further calibration of the autostereoscopic display is necessary. Thus, the time-consuming calibration operation required by known displays is eliminated and this reduces the cost and eases the manufacture of the display. Further, because the PSD 25 and the slit 26 are fixed and/or integral with the LCD panel 2 and the parallax optic, respectively, observer tracking cannot go out of calibration so that recalibration should not be necessary. This arrangement is mechanically robust so that reliability is improved. The processing electronics are substantially reduced, thus reducing the complexity, cost and power consumption of the display. No position encoder for supplying positional feedback from the parallax optic 3 is required for observer tracking. Further, look-around information can be provided without the need for such an encoder, for instance by recording the sequence of signals from the PSD 25 and integrating to give absolute observer position in angular terms.

Figure 8:
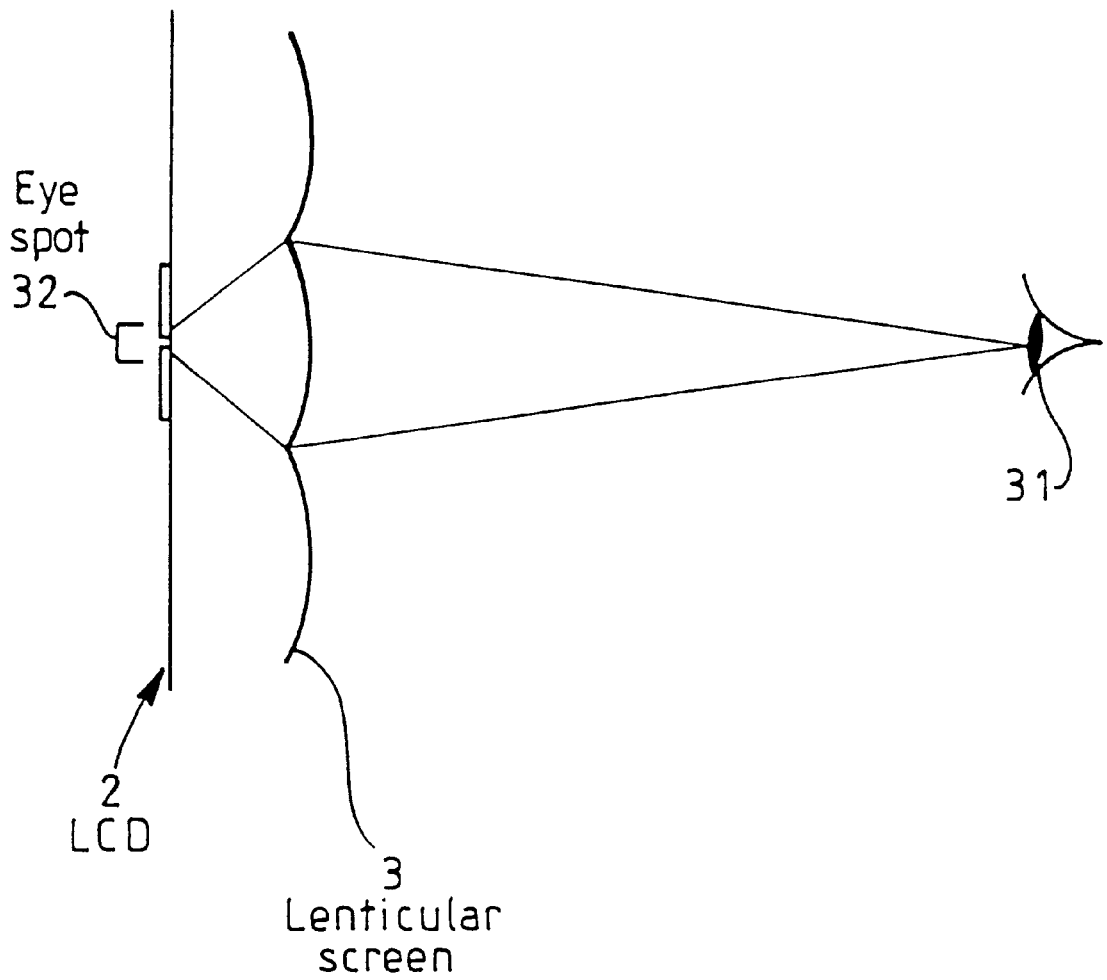
FIG. 8 illustrates eye spot formation in a lenticular screen type of display.

As shown in FIG. 8, the pupil of an eye 31 of the observer is imaged by the parallax optic 3, which is shown as a lenticular screen, onto the image plane of the LCD 2. This is referred to as the eye spot 32 which, in the case of a lenticular screen or a parallax barrier, is in fact a vertical strip. The eye spot represents the area of the LCD 2 from which light is received by the eye 31 of the observer. The eye spot is analogous to the spot imaged through the slit 26 of the parallax optic 3 on the PSD 25 from the target 22, or from the head of the observer where no target is worn. Any movement of the observer results in movement of the eye spots at the plane of the LCD 2. Simultaneously, the observer spot moves by the same amount on the PSD 25. The behaviour of the eye spots will be substantially identical to be behaviour of the observer spot so that each may be used to obtain direct information on the other.

Figure 9:
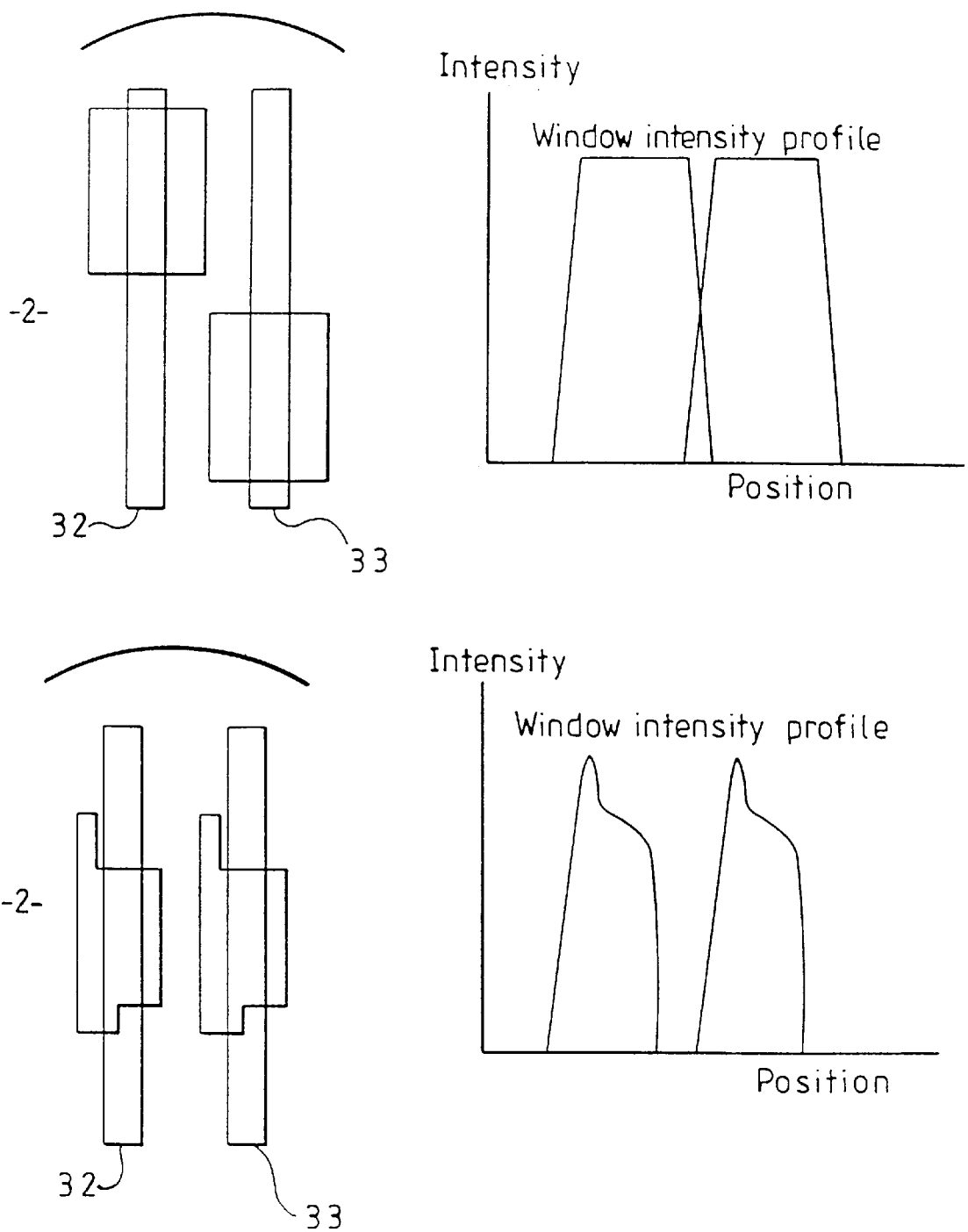
FIG. 9 illustrates eye spot position in a mechanically tracked display.

FIG. 9 illustrates the position and size of the eye spots imaged at the pixels of an LCD panel 2 together with the intensity profile. The upper part of FIG. 9 illustrates this for an SLM of the type disclosed in EP 0 625 861 whereas the lower part of FIG. 9 illustrates this for another type of conventional panel. Tracking of the display may be such that the eye spots do not remain at the lateral centres of adjacent pixel columns. For instance, delays in the system may result in delayed tracking of observer movement so that, until the display "locks on" to the observer again, the eye spots 32 and 33 deviate from their laterally central positions within the pixel columns.

The upper part of FIG. 9 illustrates intensity variations with lateral position of the eye spots for pixels of constant vertical aperture. The lower part of FIG. 9 illustrates this for conventional pixel shapes of nonconstant vertical aperture. Such configurations would lead to intensity variations during observer tracking whereas such variations are substantially eliminated with the pixel configurations of constant vertical aperture. Thus, the flicker which would result from the use of conventional configurations is substantially eliminated using the configuration shown in the upper part of FIG. 9.

Figure 10:
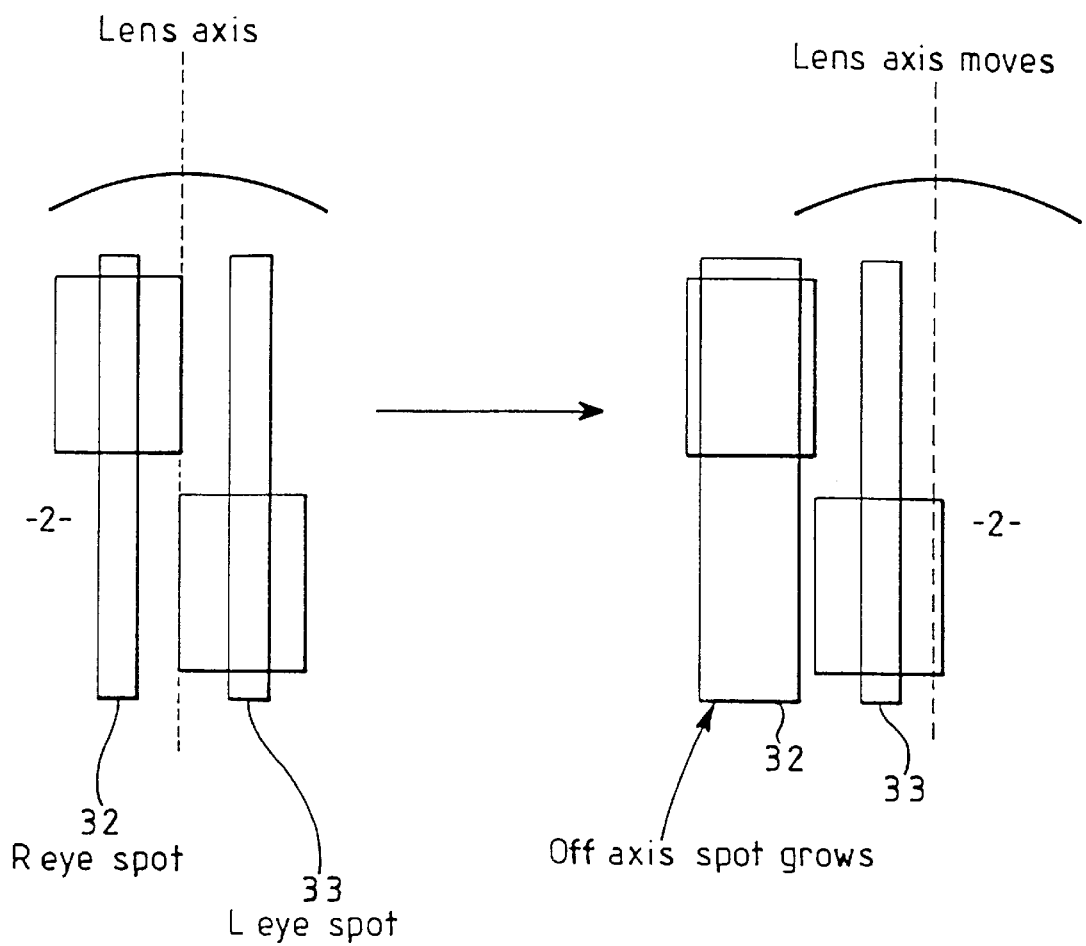
FIG. 10 illustrates the effect of display aberrations on lateral tracking.
Figure 11:
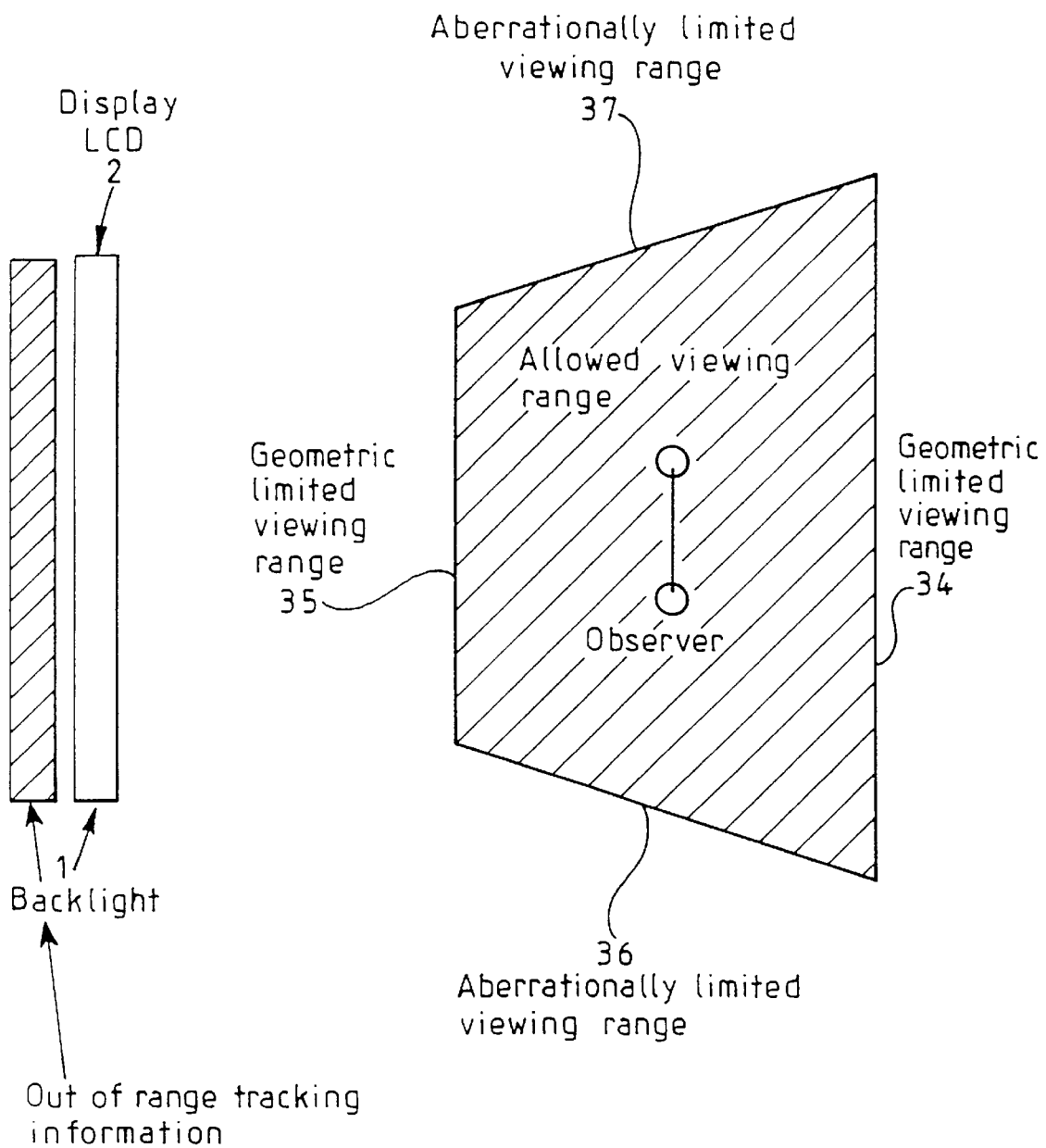
FIG. 11 illustrates the limits of viewing range on an autostereoscopic 3D display.

FIG. 10 illustrates the effect of lateral tracking on display aberrations for a lenticular screen. As the degree of relative movement between the lenticular screen and the LCD 2 increases, the width of the eye spots increases. The left part of FIG. 10 shows equal width eye spots 32 and 33 when the observer Is located on the axis of the display whereas the right part of FIG. 10 illustrates the effect of large relative lateral movements. In particular, the eye spot 32 is of much greater width because of optical aberrations. The allowable viewing freedom of the display is limited by the requirement that each eye spot must remain within the pixel it is viewing, so that there is an aberrational limit on the extent of lateral observer movement as indicated at 34 and 35 in FIG. 11 Other aberrational affects limit the longitudinal viewing range as indicated at 36 and 37. For the comfort of the observer, it is desirable not to permit viewing outside the allowed viewing range.

The aberrations also affect the observer spot formed on the PSD 25 and this may be used to fade and/or switch off the display as the observer approaches and reaches the edges of the allowed viewing range. In order to achieve this, the PSD 25 supplies information about the width of the observer spot and this is compared with one or more reference values. In the case of switching off the display at the edges of the allowed viewing range, the width of the observer spot is compared with a threshold value and, when this is exceeded, the backlight 1 and/or the LCD 2 are switched off. To provide a fade to zero function, another comparison level is used to signal when the observer is approaching the edges of the allowed viewing range and, as the observer spot width increases above this level, the output of backlight 1 and/or the image contrast of the LCD 2 are progressively reduced.

In aberrational situations, one of the eye spots tends to be slightly more aberrated than the other However, it has been found possible to optimise the system based on the position of the centre of the observer eyes. Slight performance gains may be achieved by slightly shifting the parallax optic 3 so that the more aberrated eye spot is at the centre of the associated pixels. This may be achieved by varying the optimised PSD spot position depending on its size and shape. This may be detected by recording the absolute position information of the parallax optic 3 so as to determine what the spot sizes are and positioning the parallax optic 3 with respect to the centre of gravity of the spot as measured by the PSD 25 or at the best known position for the spot.

The use of a single PSD 25 as described hereinbefore permits only angular tracking of an observer. In order to provide extended longitudinal tracking as well as lateral tracking, the second sensor arrangement 27 shown in FIG. 5 is provided. When the observer is at the window plane, the observer spots are correctly centred on both of the PSDs. However, when the observer moves out of the window plane, the observer spots become displaced either side of the central position.

Figure 12:
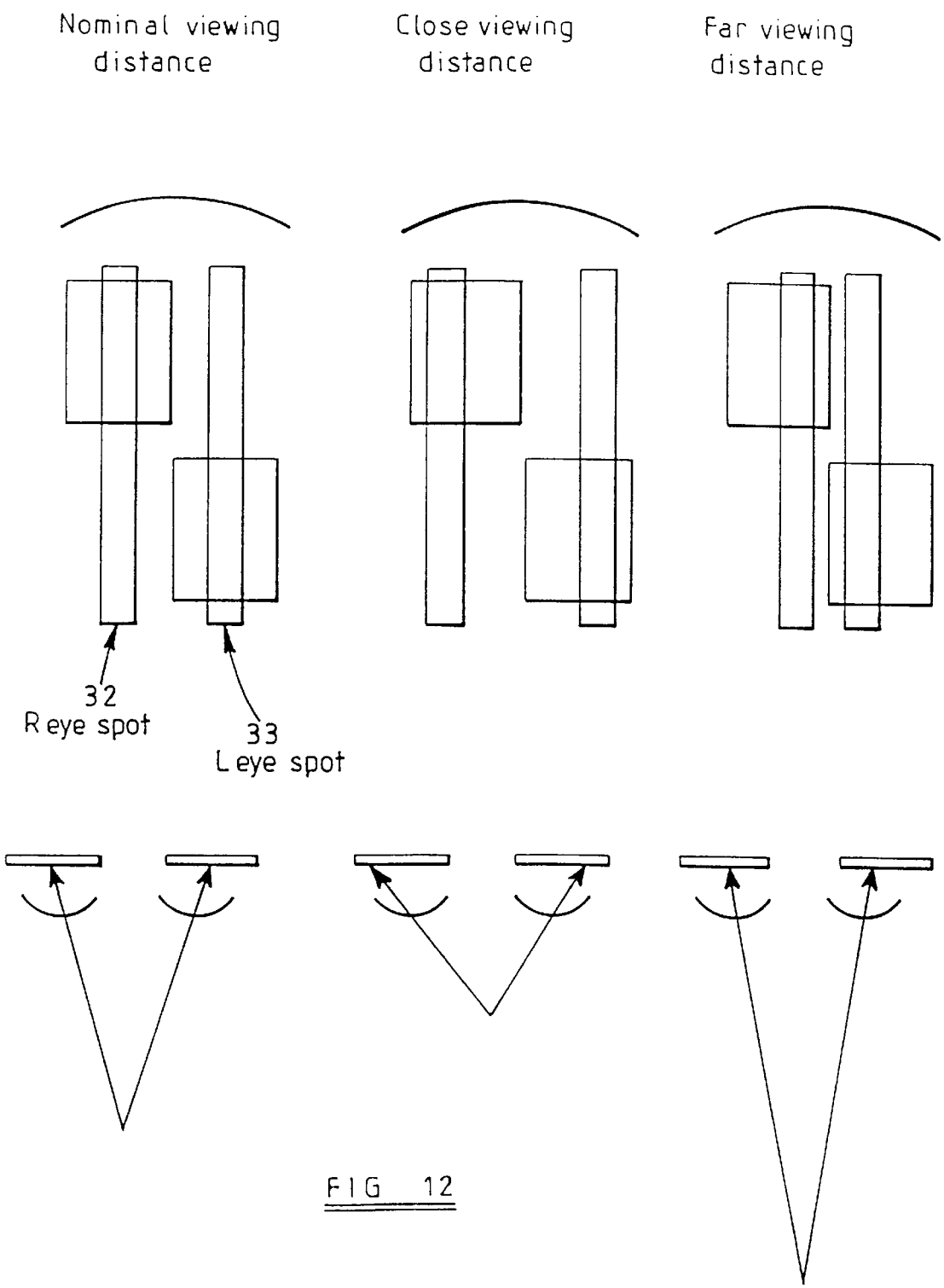
FIG. 12 illustrates the effect of longitudinal tracking on the position of eye spots.

In order to provide full lateral and longitudinal tracking of the observer, the parallax optic 3 is made movable longitudinally with respect to the LCD 2. The lateral and longitudinal positions of the parallax optic 3 are then changed until the observer spots are centred on both of the PSDs 25. In this case, the observer is maintained at the window plane (lateral tracking is then performed as described hereinbefore). Both lateral and longitudinal freedom of observer movement are thereby increased.

Where the parallax optic 3 cannot be moved longitudinally, movement away from the window plane has the effects shown in FIG. 12 on the eye spots 32 and 33 and on the observer spots on the PSDs shown in the lower part of FIG. 12. At the nominal viewing distance, the eye spots 32 and 33 are laterally centred on the adjacent pixel columns. As the observer approaches the display longitudinally, the eye spots move further apart whereas, as the observer moves further away from the display than the window plane, the eye spots move closer together. The observer spots move in a similar way as shown in the lower part of FIG. 12.

FIG. 13 illustrates how the display compensates for lateral displacement of the observer from the window plane. Essentially, the stage controller 13 receives the observer spot position information from the two PSDs 25 and moves the parallax optic 3 together with the slits 26 so that the observer spots are positioned symmetrically on the PSDs 25. FIG. 13 illustrates that, as the target 22 approaches the display, the observer spots move outwardly from the centred position on the PSDs. Provided the displacements on the PSDs 25 remain symmetrical, the viewing zones will track the eyes of the observer within the allowed longitudinal viewing range. The longitudinal viewing range is therefore increased compared with the single PSD arrangement described hereinbefore.

As described hereinbefore, integration of the signals from the PSDs 25 can be used to assess the absolute position of the observer in order to obtain look-around data. In this case, "x" (lateral) and "y" (longitudinal) measurements (and "z" (height) measurements if using 2D PSDs 25) can be made by triangulation.

In order to prevent the observer viewing the display outside the longitudinal limits of the viewing range, the display may be faded and switched off as the observer approaches and reaches the limits. This may be detected by comparing the average deviations of the observer spots on the PSDs 25 with maximum and minimum limit values and controlling the display as described hereinbefore.

The or each PSD 25 may be embodied in various ways. For instance, the PSD may comprise a linear array of detectors or an extended area silicon detector. These may be embodied as a broad area detector, a quadrant detector or a charge coupled device (CCD) array. Alternatively, a dynamic random access memory (DRAM) may be used with its cover removed and is capable of returning position information at higher resolutions than for CCD arrays but with increased noise The use of a CCD array or a DRAM may permit the infrared sources 20 to be omitted and the visible image of the observer to be used by means of image processing techniques. In this case, the image of the observer is maintained centred on the two sensors by means of moving the optics systems with respect to the sensors.

In the case of a CCD array, the size and shape of the observer spot may be analysed to determine the off-axis position and thus give a more accurate estimate of the observer position. This is particularly useful if the observer is not wearing a retroreflective dot so that the observer spot is extended in size compared with the interocular separation of the observer.

Figure 22:
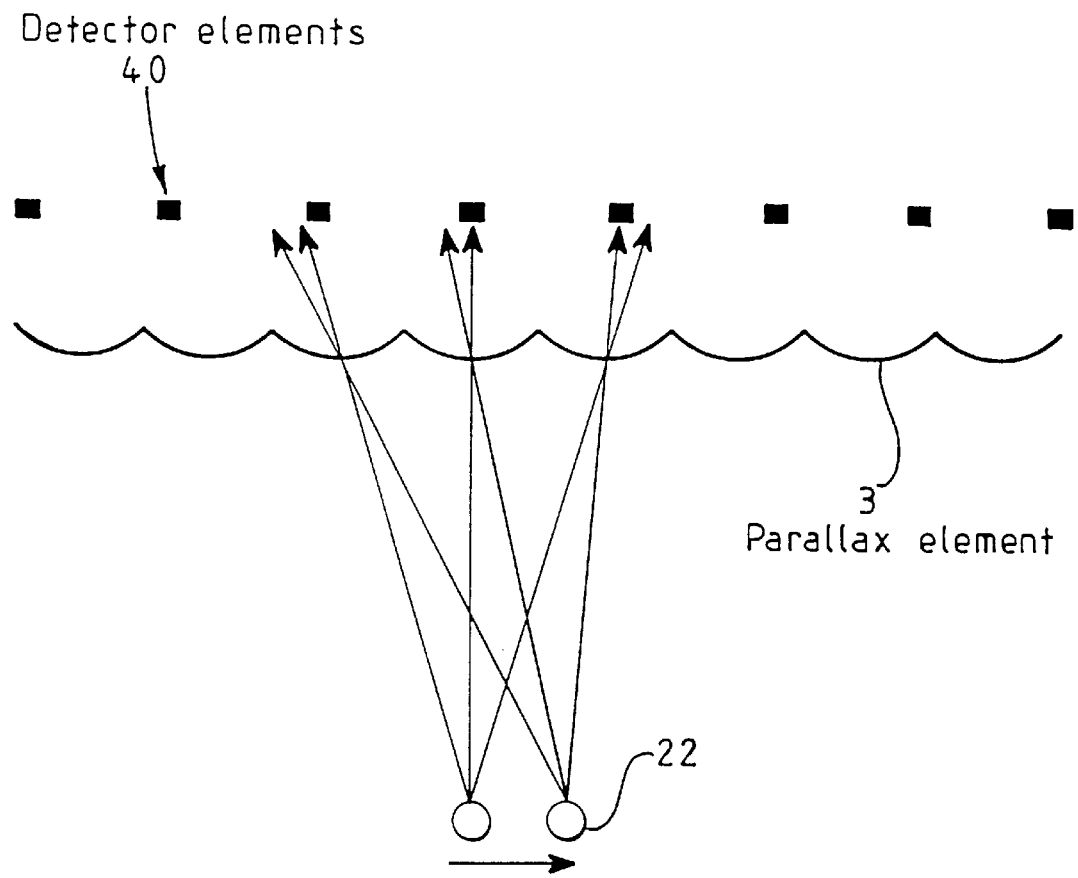
FIG. 22 illustrates diagrammatically a distributed position sensing detector system.

FIG. 22 illustrates another embodiment of the PSD in the form of a distributed position sensor co-operating with the parallax element 3 or an extension thereof. In this case, the PSD comprises a plurality of detector elements 40, for instance disposed under adjacent lenticules of a lenticular screen parallax element 3. Each of the detector elements 20 may be arranged simply to detect the presence or absence of radiation from the observer so that, when the observer is positioned on the axis of the display, the observer spot is on the central detector element whereas, when the observer is offset from the display axis, the observer spot falls on another of the detector elements 40. The resolution is given by the size of the detector element 40 covered. Imaging through side lobes of the lenticules enhances the viewing freedom of the display so that each detector element 40 can detect light in several lobes, The extended slits 26 of the parallax barrier shown in FIG. 5 or extended lenticules of a lenticular screen may be replaced by other optical imaging elements. For instance, a pin hole (not shown) may be used to provide a round observer spot rather than a line or strip. The imaging optical elements may be part of the parallax optic 3 or may be attached to it. For example aspherical components may be used which have the same lateral imaging properties as the parallax optic 3 but which vertically collect a more defined cone of light from the general height range of observer positions so as to increase the signal-to-noise ratio.

Figure 14:
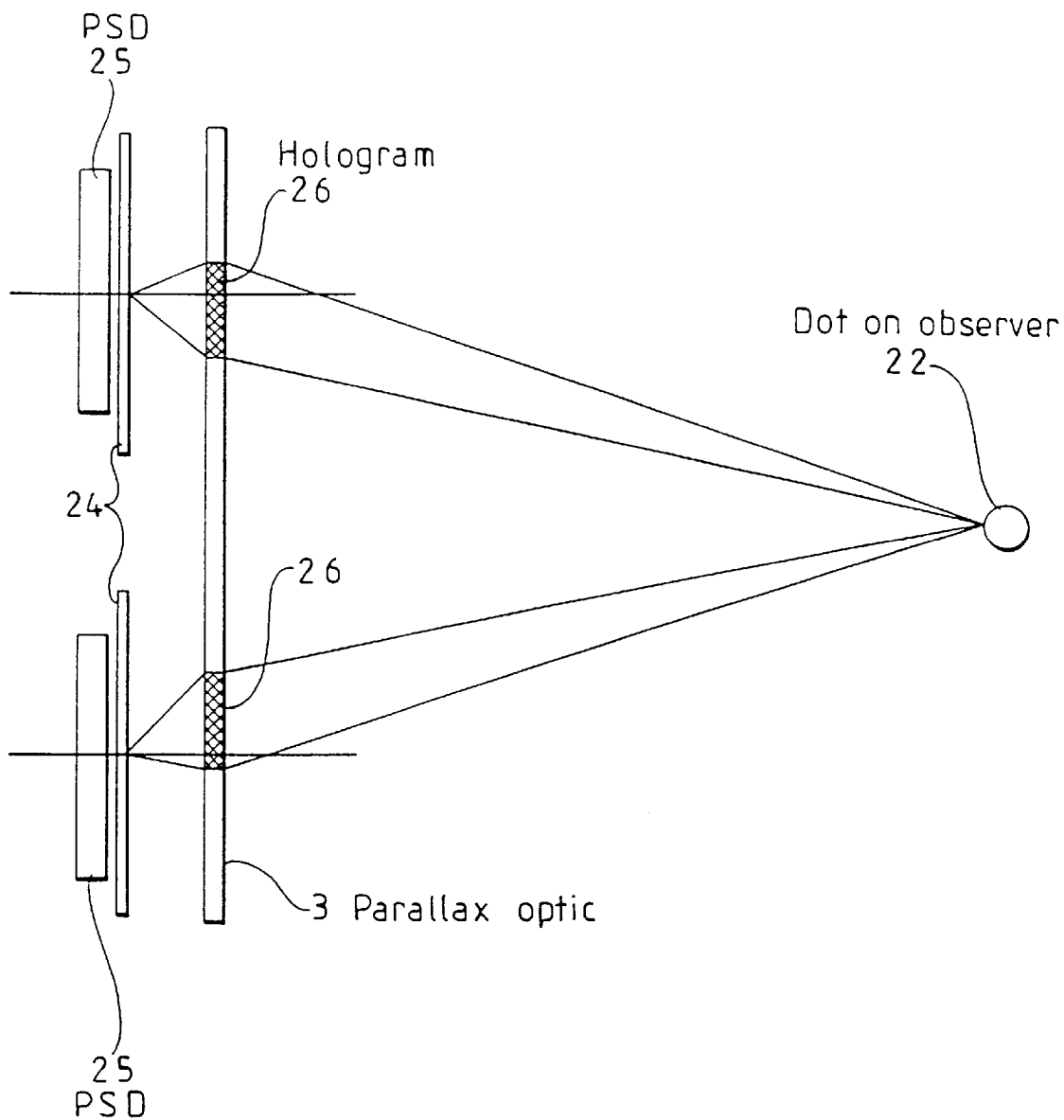
FIG. 14 illustrates part of the display showing a holographic implementation.

FIG. 14 shows an arrangement in which the optical elements 26 are holograms. Such holographic optical elements may be particularly appropriate because the illumination wavelength may be monochromatic and the elements may be disposed on the surface of a flat substrate forming the parallax optic 3. Such holographic elements act in the same way as lens elements but use diffraction. Suitable holograms may be recorded by means of interference of two appropriately defined coherent wavefronts, for instance in materials such as dichromated gelatine or photopolymer. Further, some off-axis aberration correction may be provided.

Figure 15:
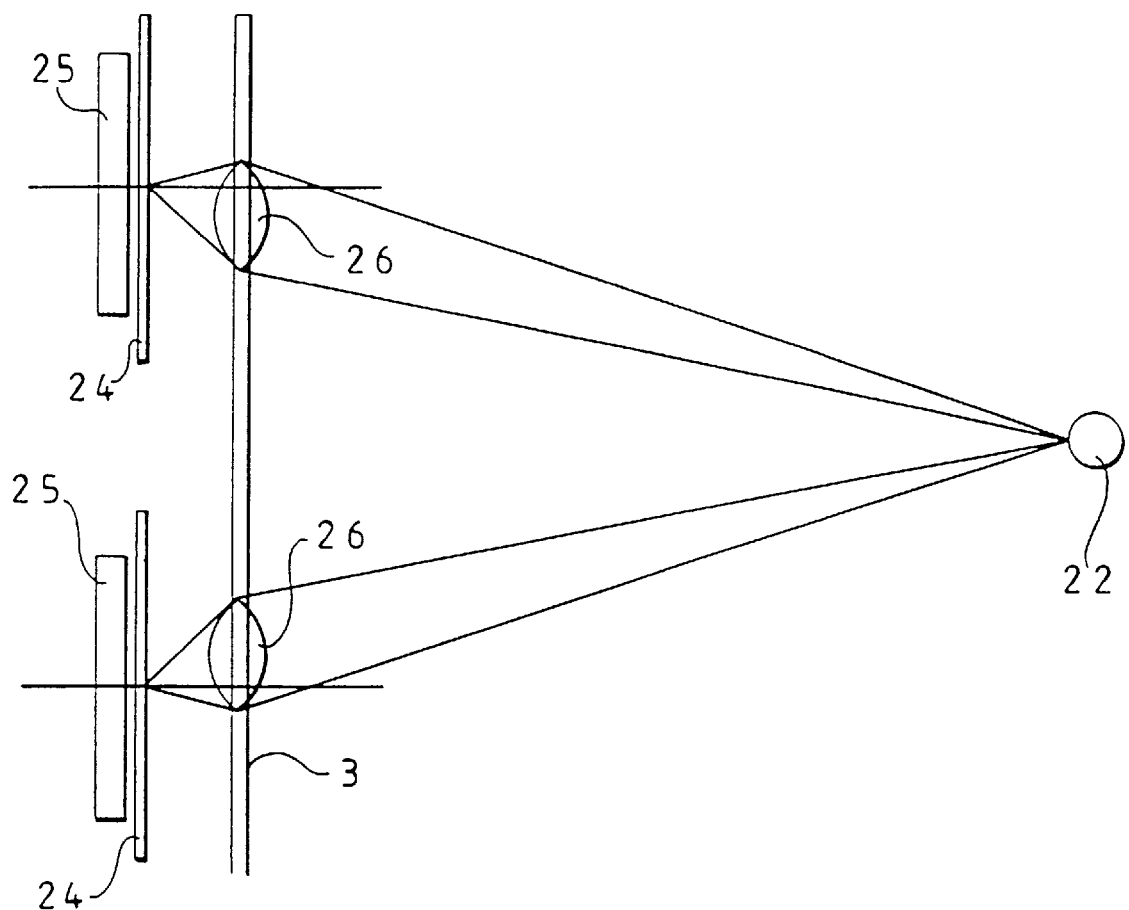
FIG. 15 is similar to FIG. 14 but shows a lens-based implementation.

As shown in FIG. 15, the element 26 may comprise lenses which may be embodied as lenticules of a lenticular screen or separate lenses which may be multiple element lenses capable of enhanced off-axis performance for maintaining a small observer spot at the PSDs 25 as the observer moves.

Such slits, lenses and holograms may be made with the same focal length as the parallax optic 3 so that there is a direct correspondence between the movement of the parallax optic and the movement of the observer spot on the PSDs. Alternatively, FIG. 16 shows an arrangement in which the focal length is made longer so that movement of the observer spot on the PSDs 25 is amplified. The element 26 may comprise, for example, an inverted telephoto lens or a hologram which performs this function. Such an element may be mounted in the plane of the parallax optic 3 or may be raised from the surface thereof.

The eye spots move from position A to position B as the observer spot moves from position A to position C. Correction of the position of the parallax optic 3 brings the eye spot back to the position A but the observer spot moves to a position D which no longer corresponds to the eye spot position. Therefore, greater accuracy of observer position measurement is obtained with some demagnification of the stage movement required to maintain autostereoscopic viewing.

The illumination sources 20 described hereinbefore are in the form of infrared LEDs which produce cones of infrared light sufficiently large to cover the whole of the observer viewing region of the display. Thus, a relatively high power device is required and light reflected other than from the observer can reduce the quality of the signal from the PSD 25. In order to overcome these disadvantages, a scanning infrared beam may be produced by disposing the sources 20 on the LCD 2 and directing the light through optical elements such as lenses 41 disposed on the parallax optic 3. The resulting infrared beams as shown in FIG. 17 move in conjunction with movement of the parallax optic 3 so that the illumination always points in the correct direction for the observer.

Cylindrical lenses 41 produce a scanning light line and, by providing two such arrangements as shown, the two lines can be used to illuminate a defined region 42 in depth. Thus, the effects of background illumination may be substantially reduced so that only the observer is effectively illuminated. This may permit the use of the target 22 worn by the observer to be eliminated.

Figure 18:
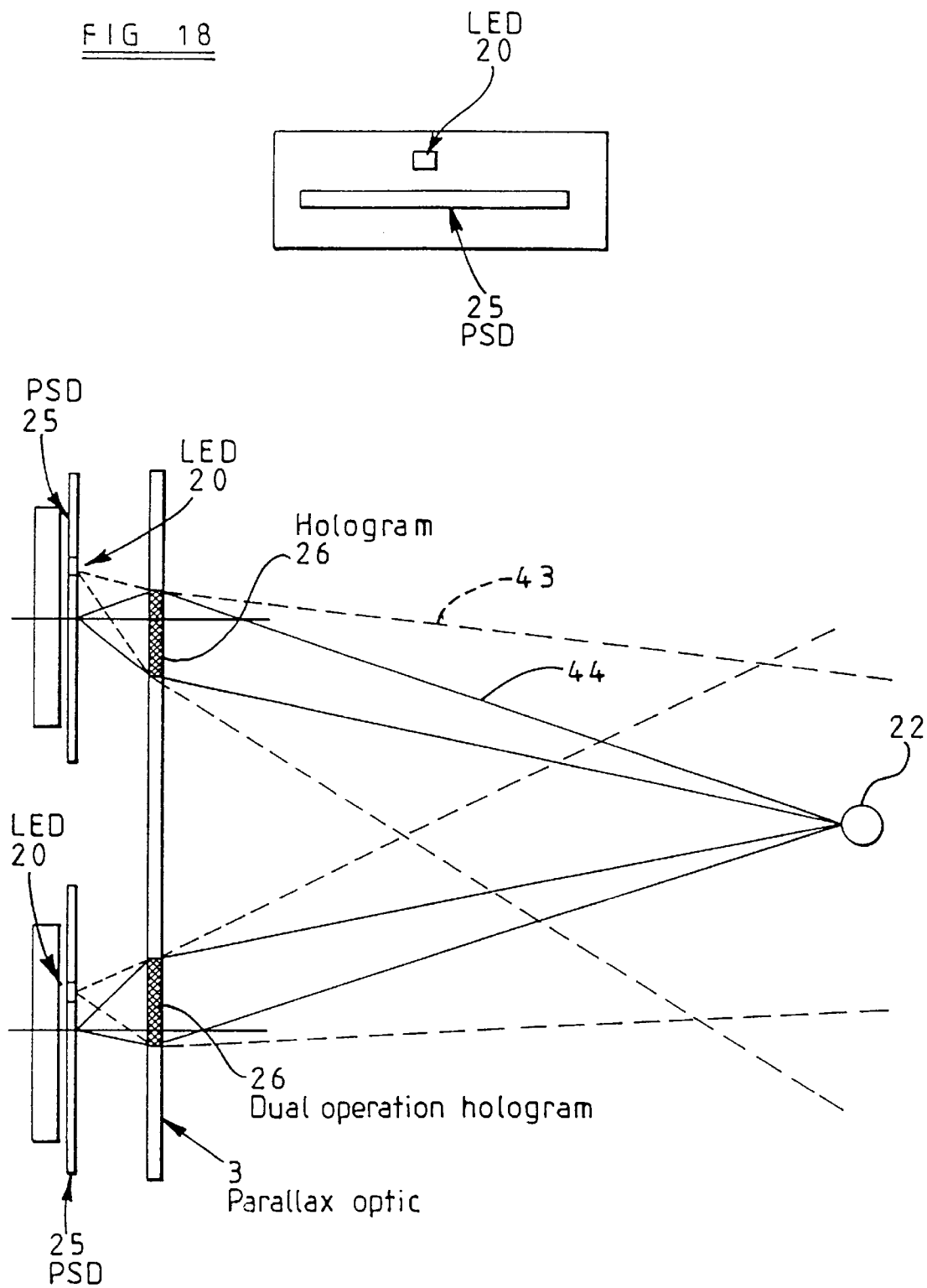
FIG. 18 illustrates a modification in which a common system is provided for illumination and position detection.

As shown in FIG. 18, the PSD 25 and the LED 20 may be integrated into a single device so as to reduce system cost. It is further possible as shown in FIG. 18 to integrate the illumination and collection optics into a single hologram 26 for each combined LED/PSD. The hologram has two functions and thus acts as a programmed beam splitter. For light from the LED 20, a broad illumination cone is produced as indicated, for instance, at 43. Light reflected from the target 22, for instance within a beam 44, is imaged by the hologram 26 at the sensitive plane of the PSD 25.

Figure 19:
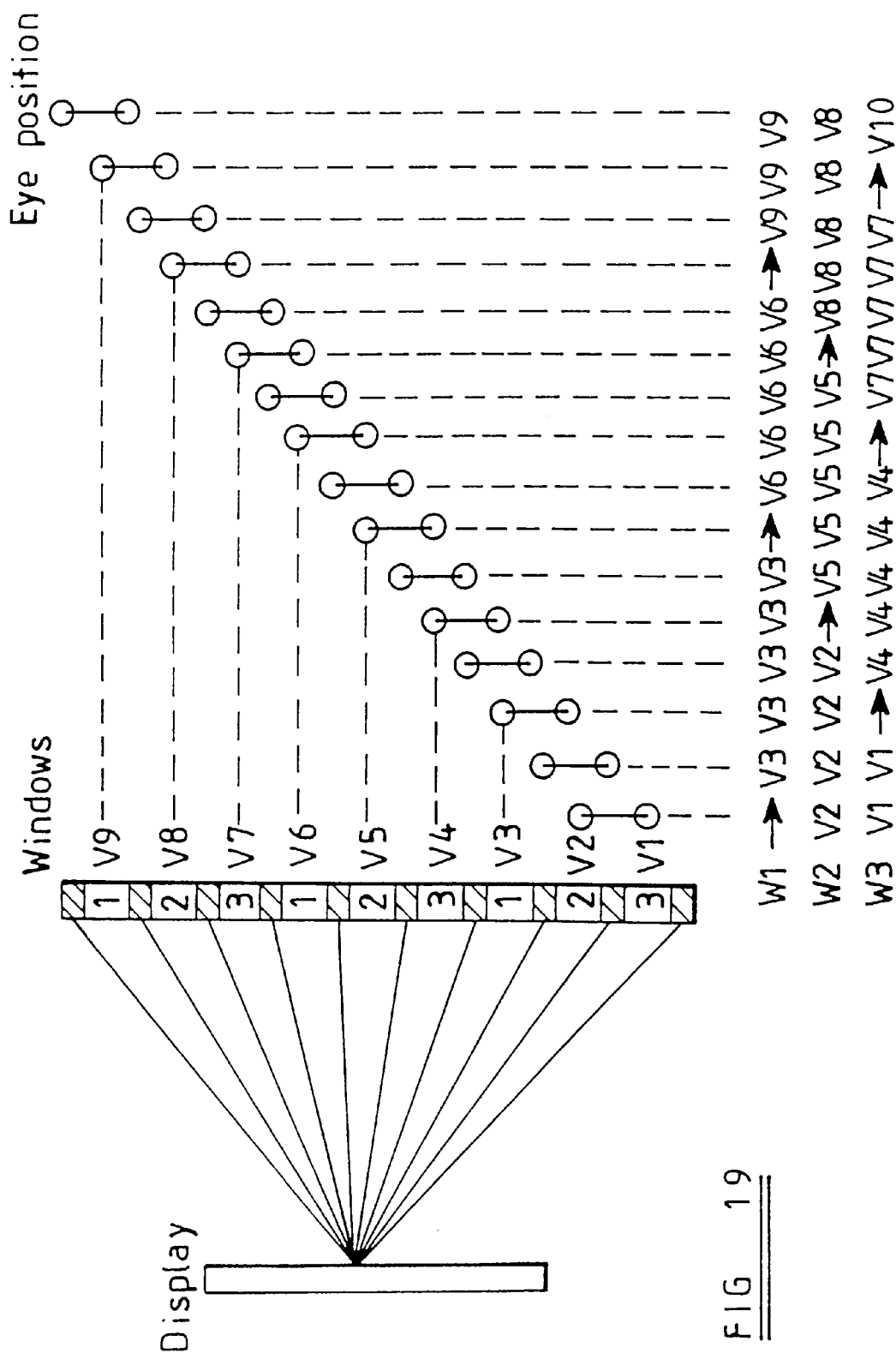
FIG. 19 illustrates a view-switching autostereoscopic 3D display.

The observer tracking techniques disclosed herein may be used with autostereoscopic 3D displays without moving parts, for instance of the type disclosed in EP 0 726 482 and EP 0 721 131. FIG. 19 illustrates a lateral tracking display of the type disclosed in EP 0 726 482. The display forms three viewing zones or windows W1, W2 and W3 which are repeated in three lobes. In order to provide a look-around facility, views V1 to V9 are supplied to the windows as indicated in FIG. 19. The tracking system is required to determine when the observer eyes are located centrally within two viewing zones so that the image displayed in the window of the viewing zone to which the observer is moving can be changed without the observer being aware of this.

Figure 20:
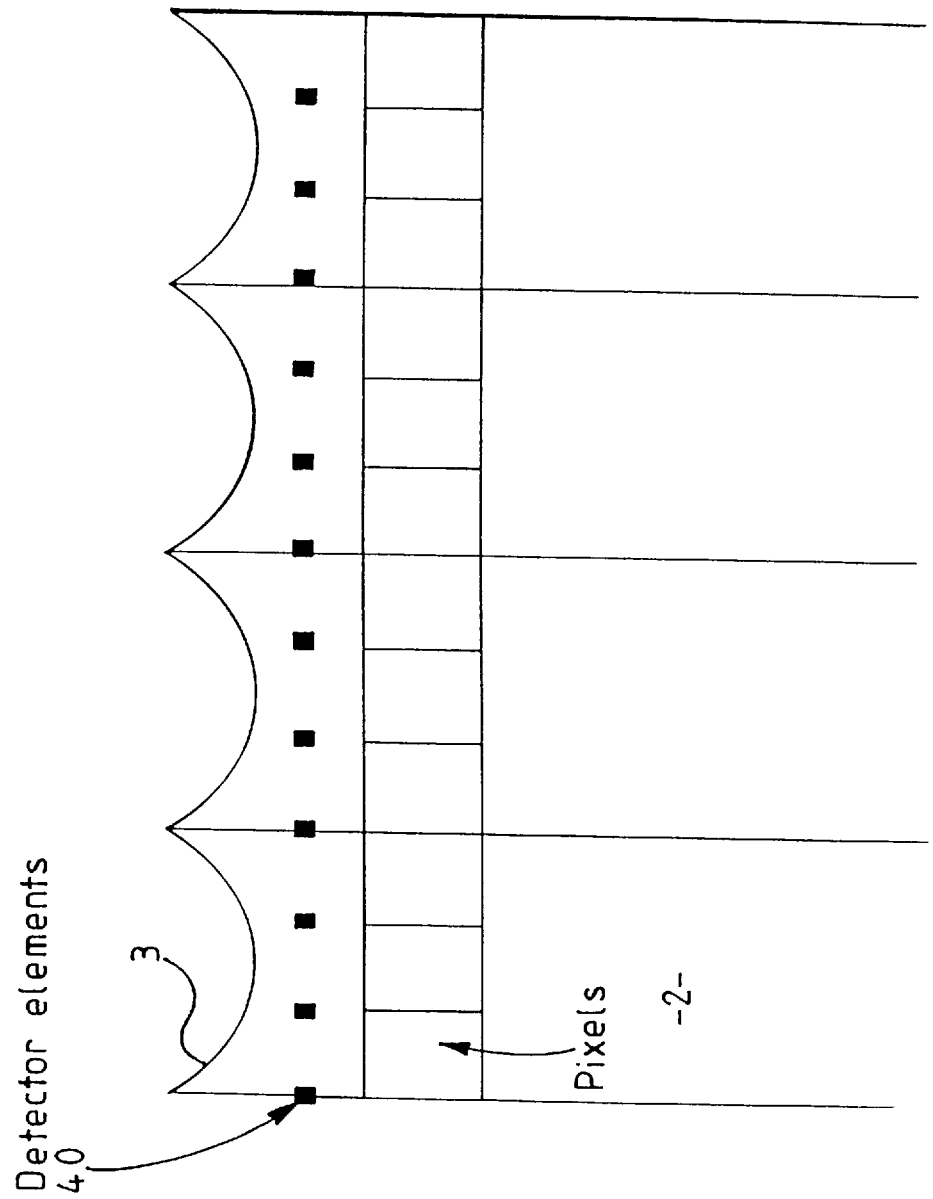
FIG. 20 illustrates a position sensor for use in the display of FIG. 19.

FIG. 20 illustrates a tracking arrangement for controlling view switching in displays of this type. Detector elements 40 are disposed so as to be aligned vertically with the adjacent edges of laterally contiguous pixels or pixel columns. The elements 40 thus receive light reflected from the observer through the parallax optic 3. As the observer eyes move to the lateral centres of adjacent pixels or pixel columns, the observer spot passes over a respective one of the detector elements 40 whose output triggers switching of the image data supplied in the other unobserved column of pixels aligned with the associated parallax element of the parallax optic 3. In the case of displays which provide viewing windows whose widths are substantially equal to two thirds of the interocular separation, two sensors are disposed at a quarter of the pixel width in from each side of the pixel to achieve appropriate switching positions.

FIG. 21 shows an example of another class of autostereoscopic 3D displays in which a steerable light source is used in association with SLMs to form the viewing zones. The display shown in FIG. 21 comprises a pair of illumination optics 45 and 46 associated with LCDs 47 and 48 for displaying the 2D images of a stereoscopic pair. A beam combiner in the form of a half mirror 49 combines the images so that the observer sees the image displayed by the LCD 47 with one eye and the image displayed by the LCD 48 with the other eye.

Each of the illumination optics 45 and 46 is associated with a respective backlight (not shown) and comprises a parallax barrier 50 and a lenticular screen 51. The slits 52 of the parallax barrier 50 act as vertical parallel evenly spaced light sources and the light from the slits is directed by the lenticules of the lenticular screen 51 into viewing zones through the respective image LCD.

In order to track the observer, the parallax barrier 50 is moved laterally with respect to the lenticular screen 51 in directions indicated by the arrows 53 and 54. Although the parallax barrier 50 is shown as being physically moved, the barrier may comprise a spatial light modulator simulating a parallax barrier to permit movement of the slits electronically, for instance as disclosed in British Patent Application No: 9620210.6.

The observer position information to permit observer tracking is provided by a PSD 25 and infrared LEDs 20 which are mounted or formed on the surface of the parallax barrier 50. The PSD 25 and the LEDs 20 are covered by the lenticular screen 51 which extends above the slits 52 of the parallax barrier 50. The observer position measuring arrangement thus functions as described hereinbefore and forms a scanning illumination beam in the same way as the arrangement disclosed in FIG. 17. The viewing zones thus track the observer.

The observer position measuring arrangement is provided on the illumination optic 45. Because the LCD 47 would attenuate light from the LEDs 20 and light returning to the PSD 25, the part of the illumination optic 45 where this arrangement is provided is not covered by the LCD 47.

Figure 23:
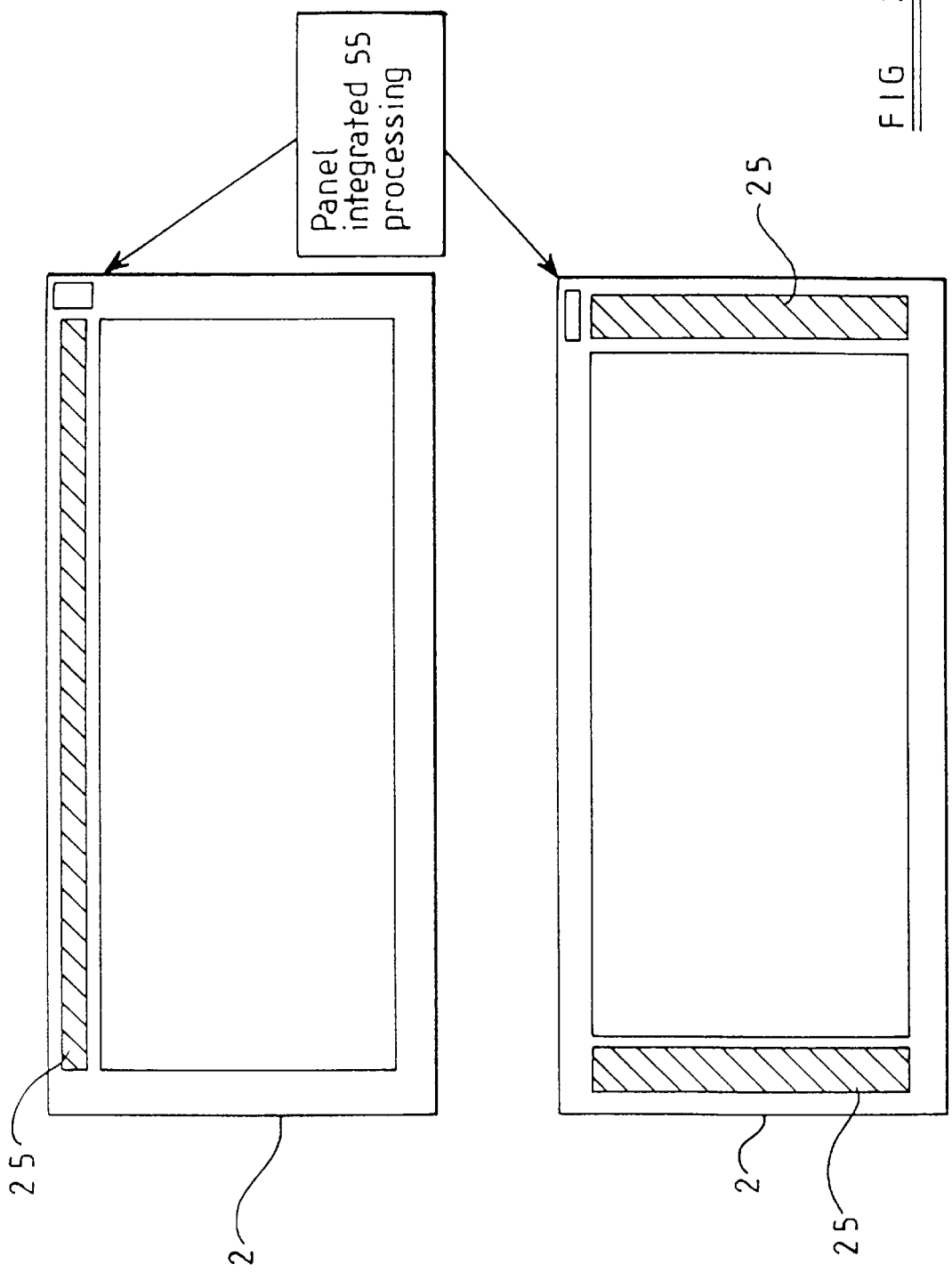
FIG. 23 illustrates possible front layouts for a display.

FIG. 23 illustrates how room may be found on the LCD 2 for PSDs 25 and for processing electronics which may be formed integrally as part of the LCD, for example with polysilicon transistors. Two layouts are shown for providing the PSDs 25 and optional processing electronics 55.

By incorporating the PSD 25 in the LCD panel 3, a cost advantage may be obtained by using the same deposition process as used for the LCD electronics. In particular, the same or similar transistors as used in the display area of the panel may be used as photo-sensitive devices by, for instance, removing parts of the black mask which usually covers the active transistor elements. The tracking system may be provided at little or no additional cost. Further, such an arrangement is more rugged and does not require a subsequent registration phase because registration is provided by the lithography which accurately defines the positions of the PSDs and the LCD pixels during fabrication.

Figure 24:
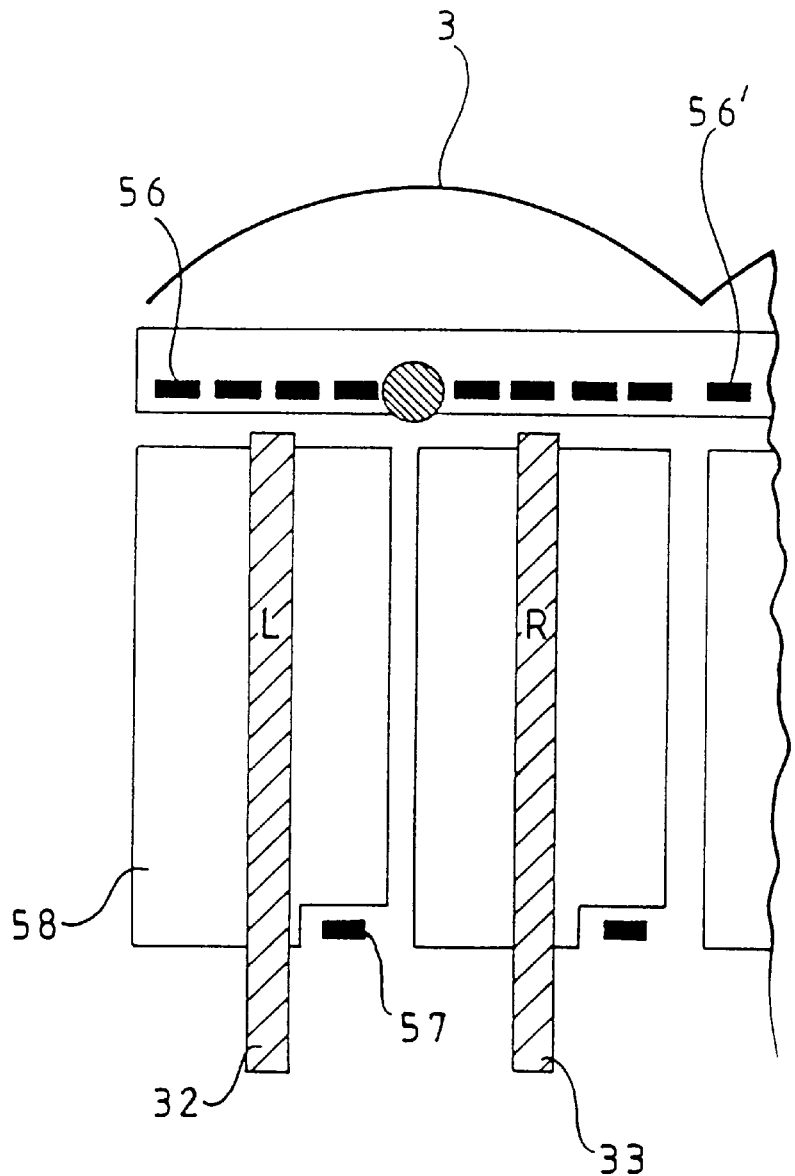
FIG. 24 illustrates a sensor comprising several phototransistors per lenticule of a lenticular screen-type of display.

FIG. 24 illustrates a possible layout in which the PSD is provided by a linear array of nine phototransistors 56. The transistors may be of the same type as thin film transistors such as 57 used to address pixels such as 58 of the LCD 2. More preferably, the transistors are of amorphous silicon optimised for photosensitivity. Optionally, further transistors such as 56' in equivalent positions under adjacent lenticules may be used to improve the signal-to-noise ratio.

Figure 25:
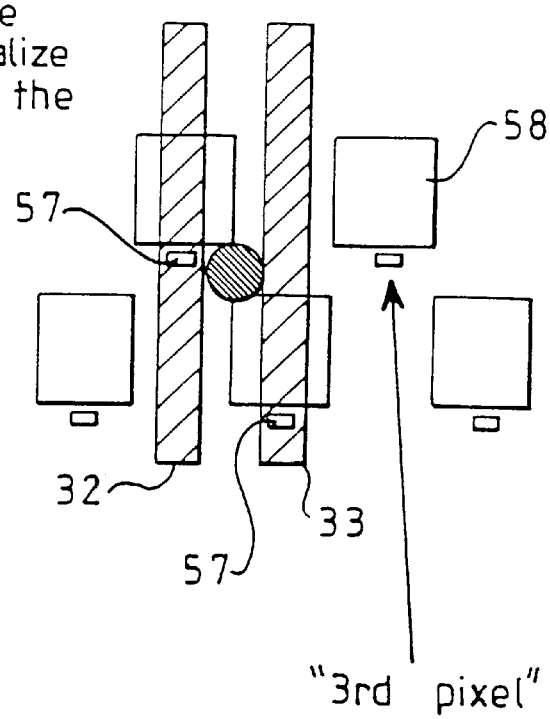
FIG. 25 illustrates an embodiment of the invention using an SLM similar to the type disclosed in EP 0 625 861.

FIG. 25 illustrates another arrangement of SLM of the type disclosed in EP 0 625 861 for providing two viewing windows in a mechanically tracked system. The correct viewing position is indicated with the eye spots 32 and 33 as shown. In this position the light reflected from the nose spot 60 is indicated by the circle. This best position is defined by equal amounts of light from the nose spot impinging on the transistors 57 under the respective eye spots 32 and 33. This condition can be detected by processing the difference in signal from these transistors and selecting the minimum. Deviations from this position will result in an increase in signal from one transistor and a decrease in the signal from the other.

FIG. 25 shows just one nose spot, but clearly the same condition is repeated along the panel and the output from multiple equivalent transistors can be used to improve signal-to-noise ratio as required. The pseudoscopic zone position can be discriminated against by, for example, not using the signal from every "3rd pixel" as shown. The signal from the transistors is used to control the mechanical position of the associated parallax generating element so as to maintain the observer position in the correct orthoscopic 3D zone.

The panel signals can be further processed to provide an absolute observer position signal so as to enable the provision of a look-around capability. A datum switch may be required to establish a starting position for the parallax optic.

Figure 26:
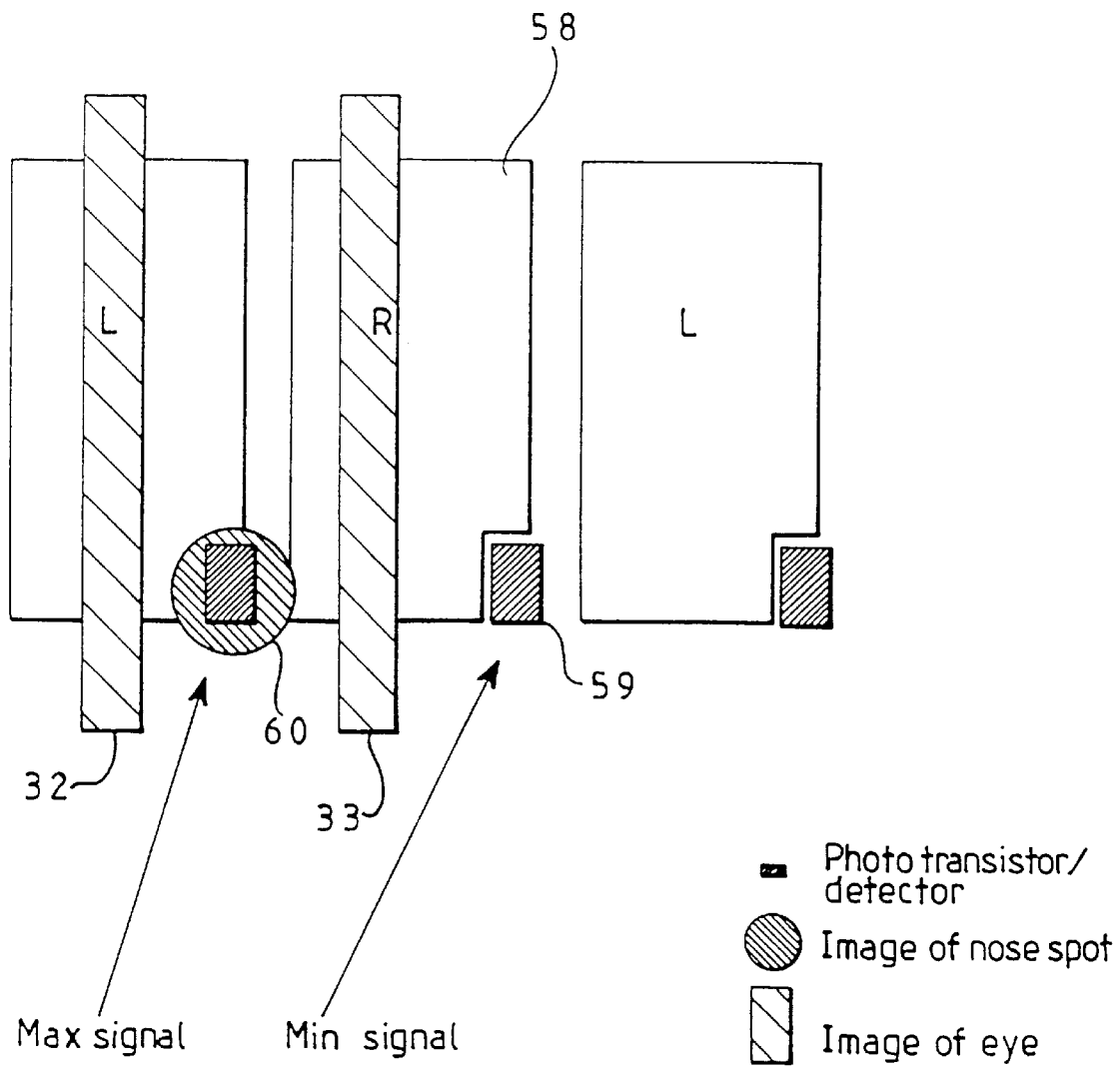
FIG. 26 illustrates an embodiment using an SLM in the form of a high aperture panel.

FIG. 26 illustrates a possible layout using a standard high aperture panel to provide a two window mechanically tracked arrangement. The transistors 59 which would normally be used to address pixels 58 are instead uncovered and used as detectors for detecting the observer spot 60. In this case, the correct viewing condition is detected by maximising the positive difference between the outputs of the transistor under the spot 60 and the transistor 59.

Figure 27:
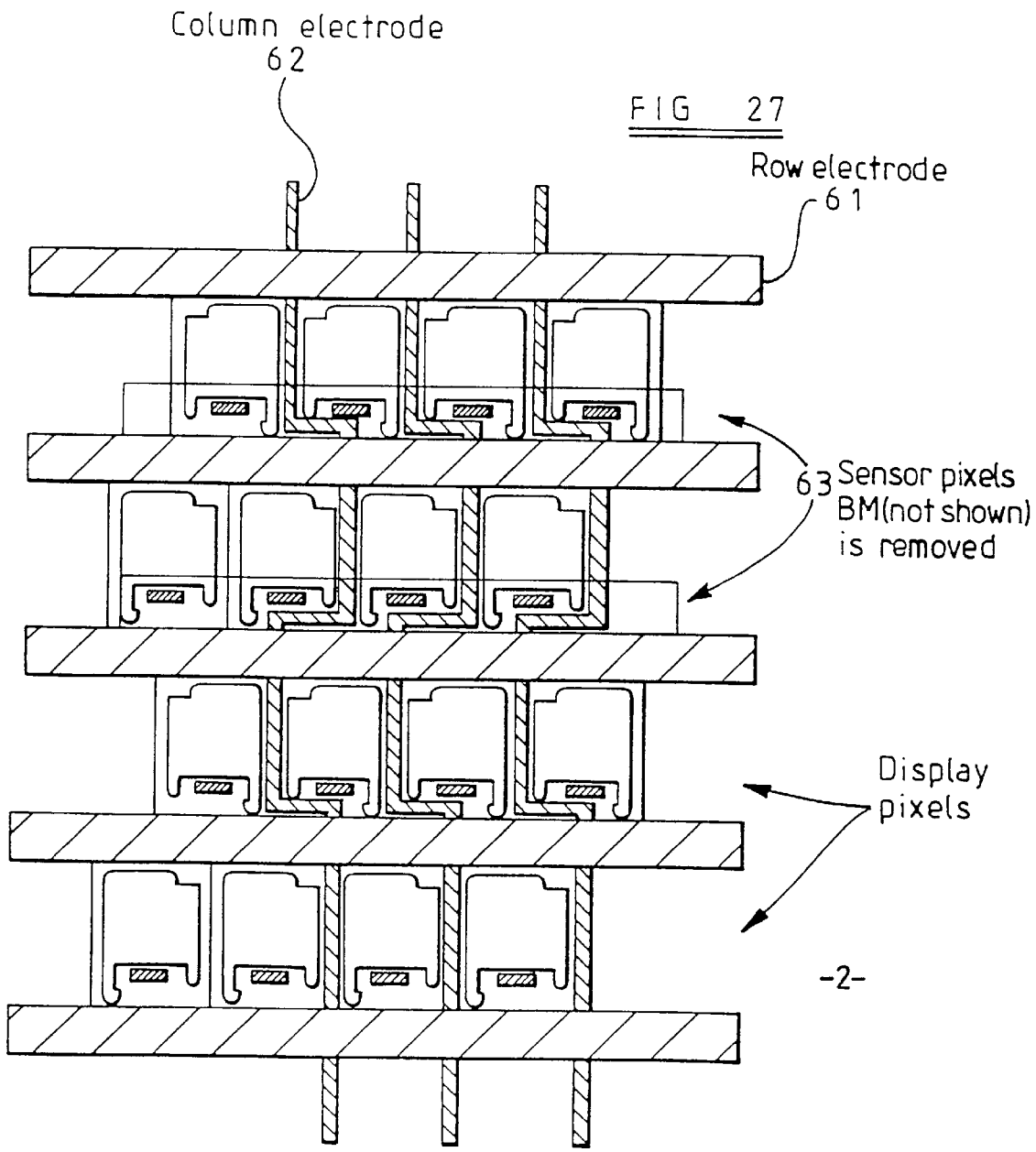
FIG. 27 illustrates a sensor incorporated in an active matrix addressing scheme of an SLM.

FIG. 27 shows an arrangement in which the sensor transistors are addressed in the same way as the display transistors by a matrix arrangement comprising row electrodes such as 61 and column electrodes such as 62. Such an addressing arrangement is of the well-known active matrix type.

The sensor pixels 63 are initially charged via the transistors so that light from the nose spot impinging on the uncovered transistors increases their leakage current, thus discharging the associated pixel. Depending on light intensity and exposure time, the sensor pixel capacitance is progressively discharged. This period of exposure time can be used to increase the sensitivity of the detector but cannot be made too long if observer position lag is important. Such times are preferably below 100 milliseconds and more preferably below 20 milliseconds.

During a second period in the addressing cycle, each row of sensor transistors is again addressed for a read operation. The transistors of the selected row are turned on and the residual charge is read out of the sensor pixels of the row by the column electrodes. Suitable times for readout include the vertical retrace time, in which the LCD panel 2 is electrically quiet, and the horizontal blanking time. Readout during a period in which the panel is electrically quiet can improve signal detection conditions.

Figure 28:
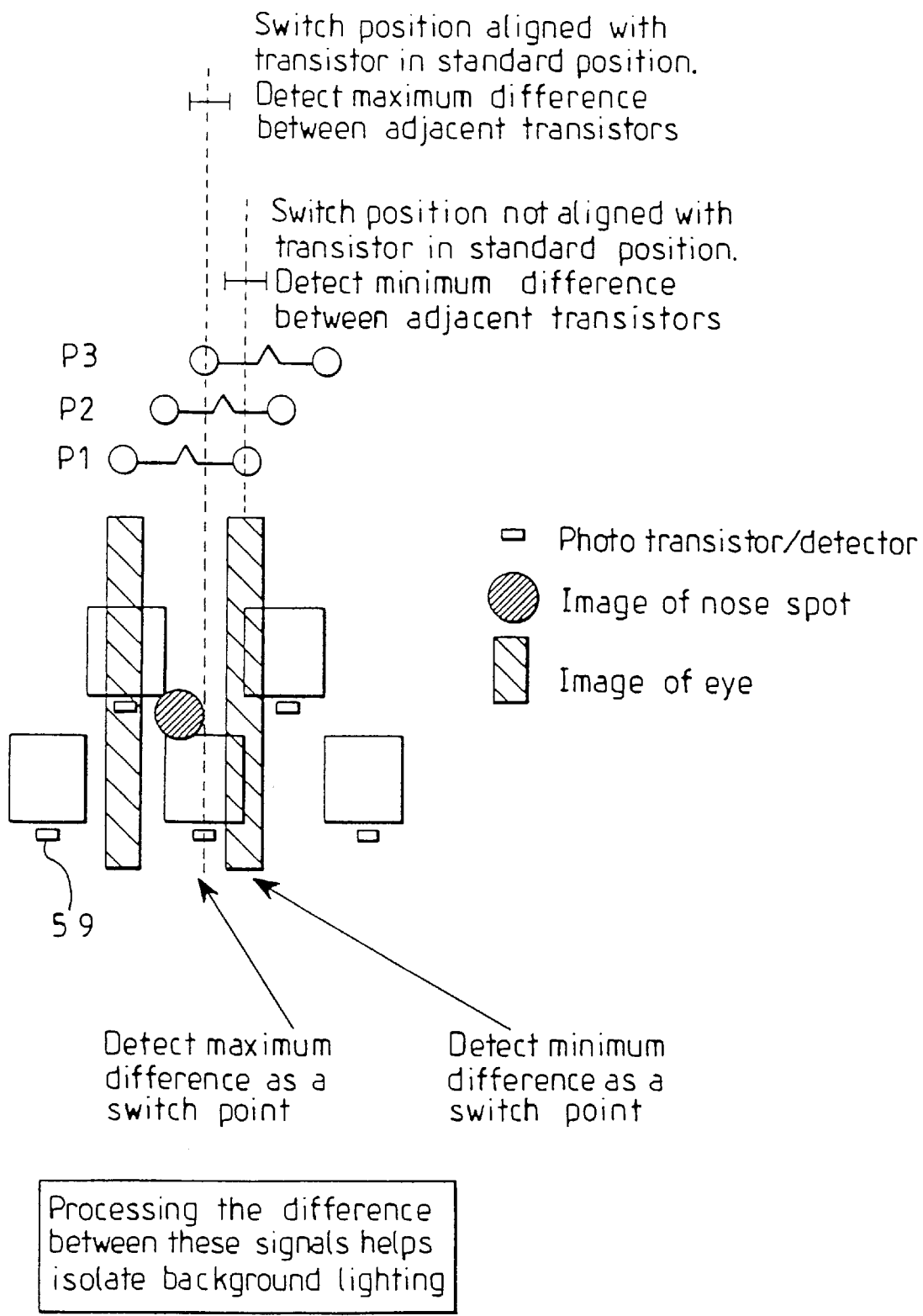
FIG. 28 illustrates a view-switching type of display using an SLM of the type disclosed in EP 0 625 861.

FIG. 28 shows an SLM of the same type as shown in FIG. 25 but operated in a three window mode suitable for electronic steering with no moving parts. In this case, the left and right image channels need to be routed to different pixels sets as the observer moves. P1, P2 and P3 illustrate the image at the panel plane of the observer eyes and nose as he moves laterally over a small region. The switching point and conditions at each point at which the image channels are routed to different sets of pixels are indicated. These show options for using the sensor transistors disposed in the same positions as the display pixel transistor array. The positions of the sensor pixels could be changed to enable different detection conditions, as described hereinbefore.

This device has the ability to perform the required switching functions totally internally without the need for an external multiplexer to switch the left and right images as the observer moves.

The photodetector properties of the transistors may be improved by changing the geometry and/or deposition conditions of the transistors.

Instead of using the LEDs 20 to illuminate the observer, the display backlight when present may be used. For instance, an infrared phosphor could be added to florescent tubes within the backlight. Alternatively, separate infrared emitters may be provided within the backlight. The infrared wavelength may be chosen to avoid absorption by polarisers within the LCD 2. Alternatively, the polarisers may be removed or omitted from the sensor area.

Phase or synchronous detection techniques may be used to improve the signal-to-noise ratio.

What is claimed is:

1. An observer tracking directional display comprising:
    an image display;
    a parallax optic;
    a first optical radiation sensor fixed in position with respect to one of the image display and the parallax optic:
    a first optical element fixed in position with respect to the other of the image display and the parallax optic and arranged to image optical radiation from an observer on the first optical radiation sensor, and
    means responsive to the first optical radiation sensor for controlling the supply of left eye and right eye images to the observer by controlling relative movement between the image display and the parallax optic.

2. A display as claimed in claim 1, wherein the first optical radiation sensor is sensitive to infrared radiation.

3. A display as claimed in claim 1, wherein the first optical radiation sensor is fixed to the image display, and the first optical element is fixed to the parallax optic.

4. A display as claimed in claim 3, wherein the first element is disposed in an image plane of the image display.

5. A display as claimed in claim 3, wherein the first optical element comprises part of the parallax optic.

6. A display as claimed in claim 5, wherein the parallax optic comprises a plurality of parallax elements and the first optical radiation sensor comprises a plurality of sensor elements, each of which is associated with a respective one of the parallax elements.

7. A display as claimed in claim 1, wherein the controlling means is arranged to adjust the relative lateral positions of the image display and parallax elements or the parallax elements of the parallax optic so as to maintain an image of the optical radiation from the observer at a substantially constant position on the first optical radiation sensor.

8. A display as claimed in claim 1, wherein the controlling means is arranged to move the parallax optic with respect to the image display.

9. A display as claimed in claim 1, wherein the parallax optic comprises a spatial light modulator arranged to simulate a parallax barrier having a plurality of apertures, and the controlling means is arranged to control the positions of the apertures.

10. A display as claimed in claim 9, wherein the apertures are slits.

11. A display as claimed in claim 1, wherein the first optical radiation sensor comprises a position sensitive detector.

12. A display as claimed in claim 11, wherein the position sensitive detector is a one dimensional position sensitive detector.

13. A display as claimed in claim 11, wherein the position sensitive detector is a two dimensional position sensitive detector.

14. A display as claimed in claim 13, wherein the position sensitive detector comprises an optically uncovered integrated circuit dynamic random access memory.

15. A display as claimed in claim 1, wherein the controlling means is arranged to switch off the image display or a light source for illuminating the image display when the width of an image of the optical radiation from the observer on the first optical radiation sensor exceeds a predetermined width.

16. A display as claimed in claim 1, wherein the controlling means is arranged to fade display of an image progressively as the width of an image of the optical radiation from the observer on the first optical radiation sensor approaches a predetermined width.

17. A display as claimed in claim 1, further comprising:
a second optical radiation sensor fixed with respect to the one of the image display and the parallax optic;
a second optical element fixed with respect to the other of the image display and the parallax optic and arranged to image optical radiation from the observer on the second optical radiation sensor.

18. A display as claimed in claim 17, wherein the second optical radiation sensor and the second optical element are substantially identical to the first optical radiation sensor and the first optical element, respectively.

19. A display as claimed in claim 17, wherein the second optical radiation sensor and the second optical element are laterally spaced from the first optical radiation sensor and the first optical element, respectively.

20. A display as claimed in claim 17, wherein the controlling means is arranged to adjust the relative lateral positions of the image display and parallax elements of the parallax optic so that the position of an image of the optical radiation from the observer on the first optical radiation sensor is displaced from a first predetermined position by an amount equal and in an opposite direction to a displacement from a second predetermined position of an image of the optical radiation from the observer on the second optical radiation sensor.

21. A display as claimed in claim 17, wherein the controlling means is arranged to adjust the relative lateral and longitudinal positions of the image display and parallax elements of the parallax optic so as to maintain images of the optical radiation from the observer at substantially constant positions on the first and second optical radiation sensors.

22. A display as claimed in claim 1, further comprising:
at least one optical radiation source fixed with respect to the one of the image display and the parallax optic, and
a respective beam forming optic fixed with respect to the other of the image display and the parallax optic and arranged to form radiation from the at least one source into a beam.

23. A display as claimed in claim 22, wherein the at least one source is disposed adjacent the first optical radiation sensor, and
wherein the respective beam forming optic comprises the first optical element.

24. A display as claimed in claim 23, wherein the first optical element comprises a holographic optical element.

25. A display as claimed in claim 1, wherein the image display and the parallax optic are arranged to form at least three viewing zones in each of at least two lobes, and the controlling means is arranged to change images in the viewing zones.

26. A display as claimed in claim 25, wherein the image display comprises laterally substantially contiguous columns of picture elements, and the first optical radiation sensor comprises a plurality of sensor elements, each of which is vertically aligned with the edges of a respective adjacent pair of columns.

27. A display as claimed in claim 1, wherein the image display comprises a spatial light modulator.

28. A display as claimed in claim 27, wherein the spatial light modulator comprises a liquid crystal device.

29. A display as claimed in claim 28, wherein the liquid crystal device is an active matrix device.

30. A display as claimed in claim 29, wherein the first optical radiation sensor comprises at least one optically exposed thin film transistor in an active matrix layer of the device.

31. A display as claimed in claim 1, further comprising an image controller responsive to the first optical radiation sensor for controlling image data supplied to the image display so as to provide look-around viewing.

32. An observer tracking illumination system for a directional display, comprising:
a light source;
an optical system for directing light from the light source into a plurality of viewing zones;
a first optical radiation sensor fixed in position with respect to the light source;
a first optical element fixed in position with respect to the optical system and is arranged to image optical radiation from an observer on the first optical radiation sensor; and
means responsive to the first optical radiation sensor for controlling at least one of the light source and the optical system for tracking the observer with the viewing zones by controlling relative movement between the light source and elements of the optical system.

33. A system as claimed in claim 32, wherein the light source is movable with respect to the optical system.

34. A system as claimed in claim 32, wherein the light source comprises a plurality of light source elements, and the optical system comprises a plurality of viewing zone forming elements.

35. A system as claimed in claim 34, wherein the light source elements are movable with respect to the viewing zone forming elements.

36. A system as claimed in claim 35, wherein the light source comprises an illuminator and a spatial light modulator arranged to simulate a parallax barrier having a plurality of apertures forming the light source elements, and the controlling means is arranged to control the positions of the apertures.

37. A system as claimed in claim 36, wherein the apertures are slits.

38. A system as claimed in claim 36, wherein the spatial light modulator is a liquid crystal device.

39. A system as claimed in claim 32, wherein the optical system is a parallax optic.

40. A system as claimed in claim 39, wherein the parallax optic is a lens array.

41. A system as claimed in claim 32, wherein the first optical element comprises the optical system.

\* \* \* \* \*